(12) United States Patent
Lim et al.

(10) Patent No.: US 10,841,622 B2
(45) Date of Patent: Nov. 17, 2020

(54) ENTROPY ENCODING METHOD, ENTROPY DECODING METHOD, AND APPARATUS USING SAME

(71) Applicant: LG ELECTRONICS INC., Seoul (KR)

(72) Inventors: Jae Hyun Lim, Seoul (KR); Seung Wook Park, Seoul (KR); Yong Joon Jeon, Seoul (KR); Chul Keun Kim, Seoul (KR); Young Hee Choi, Seoul (KR); Jung Sun Kim, Seoul (KR); Nae Ri Park, Seoul (KR); Hendry Hendry, Seoul (KR); Byeong Moon Jeon, Seoul (KR); Joon Young Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/997,464

(22) Filed: Jun. 4, 2018

(65) Prior Publication Data
US 2018/0278966 A1   Sep. 27, 2018

Related U.S. Application Data

(63) Continuation of application No. 15/151,257, filed on May 10, 2016, now Pat. No. 10,015,523, which is a
(Continued)

(51) Int. Cl.
*H04N 19/91* (2014.01)
*H04N 19/13* (2014.01)
(Continued)

(52) U.S. Cl.
CPC ............. *H04N 19/91* (2014.11); *H04N 19/13* (2014.11); *H04N 19/146* (2014.11);
(Continued)

(58) Field of Classification Search
CPC ............................. H04N 19/13; H04N 19/91
See application file for complete search history.

(56) References Cited

U.S. PATENT DOCUMENTS

| 7,079,057 B2 | 7/2006 | Kim et al. |
| 7,714,754 B2 | 5/2010 | Girardeau |
| | (Continued) | |

FOREIGN PATENT DOCUMENTS

| CN | 1909664 A | 2/2007 |
| CN | 1949873 A | 4/2007 |
| | (Continued) | |

OTHER PUBLICATIONS

JCTVC-G449—Joint Collaborative Team on Video Coding of ITU-T SG16 WP3 and ISO/IEC JTC1/SC29/WG11 7th Meeting: Geneva, CH, Nov. 21-30, 2011, Kazuo Sugimoto, Mitsubishi Electric Corporation.
(Continued)

*Primary Examiner* — Leron Beck
*Assistant Examiner* — Berteau Joisil
(74) *Attorney, Agent, or Firm* — Dentons US LLP

(57) ABSTRACT

The present invention relates to an entropy encoding method, an entropy decoding method and to an apparatus using same. The entropy decoding method includes: a step of decoding a bin of a syntax element; and a step of acquiring information on the syntax element based on the decoded bin. In the step of decoding the bin, context-based decoding or bypass decoding is performed for each bin of the syntax element.

7 Claims, 5 Drawing Sheets

Related U.S. Application Data continuation of application No. 14/673,190, filed on Mar. 30, 2015, now Pat. No. 9,420,313, which is a continuation of application No. 14/009,150, filed as application No. PCT/KR2012/002430 on Mar. 20, 2012, now Pat. No. 9,602,843.

(60) Provisional application No. 61/582,804, filed on Jan. 3, 2012, provisional application No. 61/470,502, filed on Apr. 1, 2011.

(51) Int. Cl.
| | |
|---|---|
| *H04N 19/146* | (2014.01) |
| *H04N 19/154* | (2014.01) |
| *H04N 19/159* | (2014.01) |
| *H04N 19/593* | (2014.01) |
| *H04N 19/463* | (2014.01) |
| *H04N 19/184* | (2014.01) |
| *H04N 19/52* | (2014.01) |
| *H04N 19/70* | (2014.01) |
| *H04N 19/174* | (2014.01) |

(52) U.S. Cl.
CPC ......... *H04N 19/154* (2014.11); *H04N 19/159* (2014.11); *H04N 19/174* (2014.11); *H04N 19/184* (2014.11); *H04N 19/463* (2014.11); *H04N 19/52* (2014.11); *H04N 19/593* (2014.11); *H04N 19/70* (2014.11)

(56) References Cited

U.S. PATENT DOCUMENTS

| | | | |
|---|---|---|---|
| 7,777,654 B2 | 8/2010 | Chang | 341/107 |
| 2005/0074176 A1 | 4/2005 | Marpe et al. | |
| 2006/0028359 A1 | 2/2006 | Kim et al. | |
| 2007/0030180 A1 | 2/2007 | Yang et al. | 341/50 |
| 2007/0297501 A1 | 12/2007 | Hussain et al. | |
| 2009/0096443 A1 | 4/2009 | Chang | |
| 2009/0096643 A1* | 4/2009 | Chang | H03M 7/4006 341/51 |
| 2009/0224950 A1 | 9/2009 | Xu | |
| 2010/0007534 A1 | 1/2010 | Girardeau, Jr. | |
| 2010/0177820 A1 | 7/2010 | Chono et al. | |
| 2011/0135143 A1* | 6/2011 | Zou | G06T 1/0021 382/100 |
| 2012/0177112 A1* | 7/2012 | Guo | H04N 19/13 375/240.12 |
| 2012/0177118 A1* | 7/2012 | Karczewicz | H04N 19/137 375/240.13 |
| 2013/0027230 A1 | 1/2013 | Marpe et al. | |
| 2013/0114667 A1 | 5/2013 | Auyeung | |
| 2013/0272377 A1 | 10/2013 | Karczewicz et al. | |
| 2014/0184740 A1 | 7/2014 | Zhang et al. | |

FOREIGN PATENT DOCUMENTS

| | | |
|---|---|---|
| CN | 101267559 A | 9/2008 |
| CN | 101356825 A | 1/2009 |
| CN | 101583029 A | 11/2009 |
| CN | 101873496 A | 10/2010 |
| EP | 1 624 580 A1 | 2/2006 |
| JP | 2006054877 A | 2/2006 |
| JP | 2009510807 A5 | 4/2009 |
| JP | 2009100474 A | 5/2009 |
| JP | 2009231914 A | 10/2009 |
| KR | 10-2006-0013021 A | 2/2006 |
| KR | 10-2010-0058264 A | 6/2010 |
| KR | 10-2010-0058624 A | 6/2010 |
| WO | WO2007008015 A1 | 1/2007 |
| WO | WO 2009/031648 A1 | 3/2009 |
| WO | 2012092761 A1 | 7/2012 |

OTHER PUBLICATIONS

JCTVC-H0475r2—Joint Collaborative Team on Video Coding of ITU-T SG16 WP3 and ISO/IEC JTC1/SC29/WG11 8th Meeting: San Jose, CA, Feb. 1-10, 2012, Jungsun Kim and Byeongmoon Jeon, LG Electronics.

Bross, B., et al.:"WD4: Working Draft 4 of High-Efficiency Video Coding", Joint Collaborative Team on Video Coding (JCT-VC) of ITU-T SG16 WP3 and ISO/IEC JTC1/SC29/WG11, Jul. 14-22, 2011, XP030009800.

Office Action dated Oct. 21, 2014 for corresponding Japanese Patent Application No. 2014-502486, 4 pages.

Ryoji Hattori, et al., "Fast Bypass Mode for CABAC", Joint Collaborative Team on Video Coding (JCT-VC) of ITU-T SG16 WP3 and ISO/IEC JTC1/SC29/WG11, 6th Meeting: Torino, IT, Jul. 14-22, 2011, Document JCTVC-F177, 6 pages.

Vadim Seregin, et al., "Utilisation of CABAC Equal Probability Mode for Intra Modes Coding", Joint Collaborative Team on Video Coding (JCT-VC) of ITU-T SG16 WP3 and ISO/IEC JTC1/SC29/WG11, 6th Meeting: Torino, IT, Jul. 14-22, 2011, Document JCTVC-F376, 3 pages.

Kiran Misra, et al., "Using CABAC Bypass Mode for Coding Intra Prediction Mode", Joint Collaborative Team on Video Coding (JCT-VC) of ITU-T SG16 WP3 and ISO/IEC JTC1/SC29/WG11, 7th Meeting: Geneva, CH, Nov. 21-30, 2011, Document JCTVC-G707, 7 pages.

Tammy Lee, et al., "Non-CE1: Bypass Coding of Intra Prediction Modes in CABAC", Joint Collaborative Team on Video Coding (JCT-VC) of ITU-T SG16 WP3 and ISO/IEC JTC1/SC29/WG11, 7th Meeting: Geneva, CH, Nov. 21-30, 2011, Document: JCTVC-G767, 5 pages.

International Search Report dated Oct. 30, 2012 for Application No. PCT/KR2012/002430, with English Translation, 4 pages.

Detlev Marpe et al, Context-Based Adaptive Binary Arithmetic Coding in the 11.264/AVC Video Compression Standard, IEEE Transactions on Circuits and Systems for Video Technology, vol. 13, No. 7, Jul. 2003. pp. 620-636.

Yong Suk Lee et al, Design of a CABAC Decoder for Real-Time Decoding of H.264/AVC Main Profile, DBPIA SOC Conference 2005, May 2005. pp. 299-302.

Continuation of U.S. Pat. No. 10,015,523.
Continuation of U.S. Pat. No. 9,420,313.
Continuation of U.S. Pat. No. 9,602,843.

JCTVC-F803d6: Bross et al,. Joint Collaborative Team on Video Coding (JCT-VC) of ITU-T SG16 WP3 and ISO/IEC JTC1/SC29/WG11 6th Meeting: Torino, IT, Jul. 14-22, 2011, pp. 1-15.

B. Bross et al., "WD5: Working Draft 5 of High-Efficiency Video Coding", Joint Collaborative Team on Video Coding (JCT-VC) of ITU-T SG16 WP3 and ISO/IEC JTC1/SC29/WG11, Nov. 21-30, 2011, JCTVC-G1103_d2.

* cited by examiner

ENTROPY ENCODING METHOD, ENTROPY DECODING METHOD, AND APPARATUS USING SAME

This application is a continuation of U.S. patent application Ser. No. 15/151,257 filed May 10, 2016, now allowed, which is a continuation of U.S. patent application Ser. No. 14/673,190 filed Mar. 30, 2015, now U.S. Pat. No. 9,420,313, which is a continuation of U.S. patent application Ser. No. 14/009,150 filed Dec. 23, 2013, now U.S. Pat. No. 9,602,843, which is a U.S. National Phase Application under 35 USC § 371 of International Application No. PCT/KR2012/002430 filed Mar. 20, 2012, which claims the benefit of U.S. Provisional Application No. 61/470,502 filed Apr. 1, 2011 and U.S. Provisional Application No. 61/582,804 filed on Jan. 3, 2012, which are hereby incorporated by reference in its entirety.

TECHNICAL FIELD

The present invention relates to a video compressing technique, and more particularly, to a method of performing entropy coding (encoding/decoding) and a device using the method.

BACKGROUND ART

In recent years, demands for a high-resolution and high-quality image have increased in various fields of applications. As an image has a higher resolution and higher quality, an amount of data on the video increases more and more. Accordingly, when video data is transferred using media such as existing wired or wireless broadband lines or video data is stored in existing storage media, the transfer cost and the storage cost of data increase.

In order to effectively transfer, store, and reproduce information on high-resolution and high-quality images, high-efficiency video compression techniques can be utilized.

In order to enhance video compression efficiency, a method of predicting information of a current block using information of neighboring blocks of the current block without transferring the information of the current block can be used.

Inter prediction and intra prediction can be used as the prediction method. In the inter prediction, pixel values of a current picture are predicted with reference to information of other pictures. In the intra prediction, pixel values of a current picture are predicted using inter-pixel relationships in the same picture. When the inter prediction is performed, information indicating a reference picture and information indicating a motion vector from the neighboring blocks in an inter prediction mode can be utilized to designate a part of another picture to be used for the prediction.

An encoding device entropy-encodes video information including the prediction result and transmits the encoded video information along with a bitstream. A decoding device entropy-decodes the received bitstream and reconstructs the video information.

It is possible to enhance compression efficiency of video information through the use of entropy encoding and entropy decoding.

SUMMARY OF THE INVENTION

Technical Problem

An object of the invention is to provide a method and a device for effectively performing entropy coding to enhance coding efficiency.

Another object of the invention is to provide a method and a device for effectively utilizing contexts in entropy coding.

Another object of the invention is to provide a method and a device for utilizing different contexts depending on states and conditions in entropy coding.

Solution to Problem (1) According to an aspect of the invention, there is provided an entropy decoding method including the steps of: decoding bins of a syntax element; and obtaining information on the syntax element on the basis of the decoded bins, wherein the step of decoding the bins includes performing context-based decoding or bypass decoding on a bin of the syntax element. At this time, the context may be adaptively calculated or may have a predetermined fixed value.

(2) In (1), the step of decoding the bins may include applying independent context to the bin of the syntax element.

(3) In (1), the step of decoding the bins may include applying a bypass mode to some bins of the bins of the syntax element and applying independent contexts to the other bins.

(4) In (1), the step of decoding the bins may include applying independent context to the bin which is decoded on the basis of context and the independent context may be a context which is updated independently of the other contexts.

(5) In (1), the step of decoding the bins may include determining whether the bin of the syntax element is to be bypass-decoded and performing decoding based on contexts when it is determined that the bin is not bypass-decoded.

(6) In (1), the step of decoding the bins may include performing decoding on the basis of context index allocated to the bin of the syntax element with a context index table on which the context indices are allocated to the bins of the syntax element.

(7) In (6), the context index table may allocate the same context index to some bins of the bins of the syntax element.

(8) In (6), the context index table may allocate the same context index to some bins of the bins of the syntax element and may allocate a bypass mode to some bins.

(9) In (1), the step of decoding the bins includes performing decoding using a context index table.

The context index table may allocate context indices and an offset based on the type of a picture to be coded to the bins of the syntax element, and the bin of the syntax element may be decoded on the basis of a context indicated by the sum of the context index and the offset.

(10) In (9), the context index table may allocate the same context index to some bins of the bins of the syntax element.

(11) In (9), the context index table may allocate the same context index to some bins of the bins of the syntax element and may allocate a bypass mode to some bins.

(12) According to another aspect of the invention, there is provided an entropy decoding device including: an entropy decoding module that decodes bins of a syntax element; and a prediction module that generates a prediction block on the basis of the decoded syntax element, wherein the entropy decoding module performs context-based decoding or bypass decoding on a bin of the syntax element.

(13) In (12), the entropy decoding module may apply a bypass mode to some bins of the bins of the syntax element and may apply independent contexts to the other bins.

(14) In (12), the entropy decoding module may perform decoding on the basis of context index allocated to the bin of the syntax element with a context index table on which the context indices are allocated to the bins.

(15) In (12), the entropy decoding module may perform decoding using a context index table, the context index table may allocate context indices and an offset based on the type of a picture to be coded to the bins of the syntax element, and the bin of the syntax element may be decoded on the basis of a context indicated by the sum of the context index and the offset.

Advantageous Effects

According to the invention, it is possible to effectively perform entropy coding to enhance coding efficiency.

According to the invention, it is possible to enhance coding efficiency of entropy coding by effectively utilizing contexts in performing the entropy coding.

According to the invention, it is possible to enhance coding efficiency of entropy coding by reflecting states and conditions in performing the entropy coding and applying different contexts.

DESCRIPTION OF EXEMPLARY EMBODIMENTS

Figure 1:
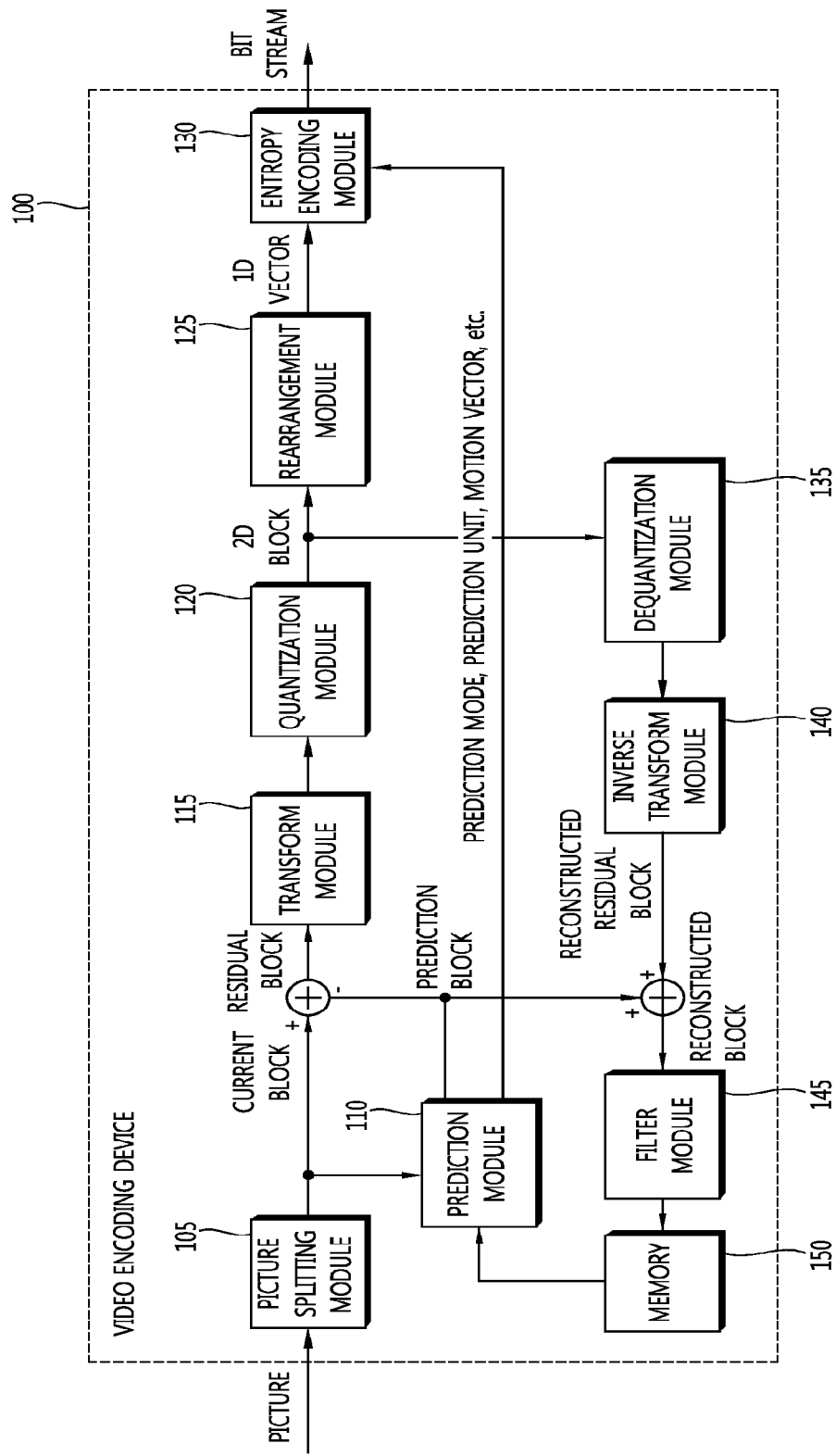
FIG. 1 is a block diagram schematically illustrating a video encoding device (encoder) according to an embodiment of the invention.

The invention can be variously modified in various forms and can have various embodiments, and specific embodiments thereof will be described in detail and shown in the drawings. However, the embodiments are not intended for limiting the invention. Terms used in the below description are used to merely describe specific embodiments, but are not intended for limiting the technical spirit of the invention. An expression of a singular number includes an expression of a plural number, so long as it is clearly read differently. Terms such as "include" and "have" are intended for indicating that features, numbers, steps, operations, elements, components, or combinations thereof used in the below description exist, and it should be thus understood that the possibility of existence or addition of one or more different features, numbers, steps, operations, elements, components, or combinations thereof is not excluded.

On the other hand, elements of the drawings described in the invention are independently drawn for the purpose of convenience for explanation of different specific functions in a video encoding/decoding device, and does not mean that the elements are embodied by independent hardware or independent software. For example, two or more elements out of the elements may be combined to form a single element, or one element may be divided into plural elements. Embodiments in which the elements are combined and/or divided belong to the scope of the invention without departing from the concept of the invention.

Hereinafter, exemplary embodiments of the invention will be described in detail with reference to the accompanying drawings.

FIG. 1 is a block diagram schematically illustrating a video encoding device (encoder) according to an embodiment of the invention. Referring to FIG. 1, a video encoding device 100 includes a picture dividing module 105, a prediction module 110, a transform module 115, a quantization module 120, a rearrangement module 125, an entropy encoding module 130, a dequantization module 135, an inverse transform module 140, a filter module 145, and a memory 150.

The picture dividing module 105 can divide an input picture into at least one process unit. Here, the process unit may be a prediction unit (hereinafter, referred to as a "PU"), a transform unit (hereinafter, referred to as a "TU"), or a coding unit (hereinafter, referred to as a "CU"). In this specification, for the purpose of convenience for explanation, a prediction unit may be expressed by a prediction block, a transform unit may be expressed by a transform block, and a coding unit may be expressed by a coding block.

The prediction module 110 includes an inter prediction module that performs an inter prediction process and an intra prediction module that performs an intra prediction process. In order to enhance coding efficiency, a picture signal is not encoded without any change, but is encoded so as to reconstruct a picture by predicting a picture using a previously-encoded area and adding residual values between an original picture and the predicted picture to the predicted picture.

As a picture including a previously-encoded area used for the prediction, an I picture (I slice), a P picture (P slice), a B picture (B slice), and the like are known. The I slice is a slice which is decoded through only the intra prediction. The P slice is a slice which can be decoded through the inter prediction or the intra prediction using at least one motion vector and a reference picture index to predict sample values of blocks. The B slice is a slice which can be decoded through the inter prediction or the intra prediction using at least two motion vectors and reference picture indices to predict sample values of blocks.

The prediction module 110 performs a prediction process on process units of a picture to create a prediction block including predicted samples. In the prediction module 110, the process unit of a picture may be a CU, a TU, or a PU. It can be determined whether the prediction performed on the corresponding process unit is the inter prediction or the intra prediction, and specific details (for example, a prediction mode) of the prediction methods can be determined. The process unit subjected to the prediction process may be different from the process unit of which the prediction method and the specific details are determined. For example, the prediction method and the prediction mode may be determined by the PU units and the prediction process may be performed by the TU units.

In the inter prediction, a prediction process is performed on the basis of information on at least one of a previous picture and/or a subsequent picture of a current picture to create a prediction block. In the intra prediction, a prediction process is performed on the basis of pixel information of a current picture to create a prediction block.

In the inter prediction, a reference picture is selected for a current block, and a reference block having the same size as the current block is selected to create a prediction block of the current block. For example, in the inter prediction, a prediction block can be created so as to minimize a residual signal from the current block and to minimize the magnitude of a motion vector. On the other hand, a skip mode, a merge mode, an AMVP (Advanced Motion Vector Prediction), or the like can be used as the intra prediction method. The prediction block may be created in the unit of pixel samples less than an integer pixel, such as ½ pixel samples and ¼ pixel samples. Here, a motion vector can also be expressed in the unit of pixel samples less than an integer pixel. For example, luma pixels can be expressed in the unit of ¼ pixels and chroma pixels can be expressed in the unit of ⅛ pixels.

Information such as an index of a reference picture selected through the inter prediction, a motion vector predictor, and a residual signal is entropy-encoded and is transmitted to a decoder.

When the intra prediction is performed, the process unit subjected to the prediction process may be different from the process unit of which the prediction method and the specific details are determined. For example, a prediction mode may be determined in the unit of PU and the prediction process may be performed in the unit of PU. Alternatively, a prediction mode may be determined in the unit of PU and the inter prediction may be performed in the unit of TU.

The prediction modes in the intra prediction include 33 directional prediction modes and at least two non-directional modes. The non-directional modes include a DC prediction mode and a planar mode.

In the intra prediction, a prediction block can be created after a filter is applied to reference samples. At this time, it can be determined whether a filter is applied to reference samples depending on the intra prediction mode and/or the size of the current block.

A PU can be determined in various sizes/shapes from a CU which is not divided any more. For example, in case of the inter prediction, a PU can have sizes such as 2N×2N, 2N×N, N×2N, and N×N. In case of the intra prediction, a PU can have sizes such as 2N×2N and N×N (where N is an integer). The PU having a size of N×N can be set to be applied to only a specific case. For example, the PU having a size of N×N can be set to be used for only a coding unit having the smallest size or can be set to be used for only intra prediction. In addition to the PUs having the above-mentioned sizes, PUs having sizes such as N×mN, mN×N, 2N×mN, and mN×2N (where m<1) may be additionally defined and used.

Residual values (a residual block or a residual signal) between the created prediction block and the original block are input to the transform module 115. The prediction mode information, the motion vector information, and the like used for the prediction are encoded along with the residual values by the entropy encoding module 130 and are transmitted to the decoder.

The transform module 115 performs a transform process on the residual block in the unit of TU and creates transform coefficients. The transform unit in the transform module 115 may be a TU and may have a quad tree structure. The size of the transform unit can be determined within a predetermined largest and smallest size range. The transform module 115 can transform the residual block using a DCT (Discrete Cosine Transform) and/or a DST (Discrete Sine Transform).

The quantization module 120 can quantize the residual values transformed by the transform module 115 and can create quantization coefficients. The values calculated by the quantization module 120 can be supplied to the dequantization module 135 and the rearrangement module 125.

The rearrangement module 125 can rearrange the quantization coefficients supplied from the quantization module 120. By rearranging the quantization coefficients, it is possible to enhance the encoding efficiency in the entropy encoding module 130. The rearrangement module 125 can rearrange the quantization coefficients in the form of a two-dimensional block to the form of a one-dimensional vector through the use of a coefficient scanning method. The rearrangement module 125 can enhance the entropy encoding efficiency in the entropy encoding module 130 by changing the order of coefficient scanning on the basis of stochastic statistics of the coefficients transmitted from the quantization module.

The entropy encoding module 130 performs an entropy encoding process on the quantization coefficients rearranged by the rearrangement module 125. Examples of the entropy encoding method include an exponential golomb method, a CAVLC (Context-Adaptive Variable Length Coding) method, and a CABAC(Context-Adaptive Binary Arithmetic Coding) method. The entropy encoding module 130 can encode a variety of information such as residual coefficient information and block type information of a coding unit, prediction mode information, division unit information, prediction unit information, transfer unit information, motion vector information, reference picture information, block interpolation information, and filtering information transmitted from the rearrangement module 125 and the prediction module 110.

The entropy encoding module 130 may give a predetermined change to a parameter set or a syntax to be transmitted, if necessary.

The dequantization module 135 inversely quantizes the values quantized by the quantization module 120. The inverse transform module 140 inversely transforms the values inversely quantized by the dequantization module 135. The residual values created by the dequantization module 135 and the inverse transform module 140 are merged with the prediction block predicted by the prediction module 110 to create a reconstructed block.

The filter module 145 applies a deblocking filter, an ALF (Adaptive Loop Filter), an SAO (Sample Adaptive Offset) to the reconstructed picture.

The deblocking filter removes a block distortion generated at the boundary between blocks in the reconstructed picture. The ALF performs a filtering process on the basis of the resultant values of the comparison of the original picture with the reconstructed picture of which the blocks are filtered by the deblocking filter. The ALF may be applied only when high efficiency is necessary. The SAO reconstructs offset differences between the residual blocks having the deblocking filter applied thereto and the original picture and is applied in the form of a band offset, an edge offset, or the like.

On the other hand, the filter module 145 may not perform a filtering process on a reconstructed block used for the inter prediction.

The memory 150 stores the reconstructed block or picture calculated by the filter module 145. The reconstructed block or picture stored in the memory 150 is supplied to the prediction module 110 that performs the inter prediction.

Figure 2:
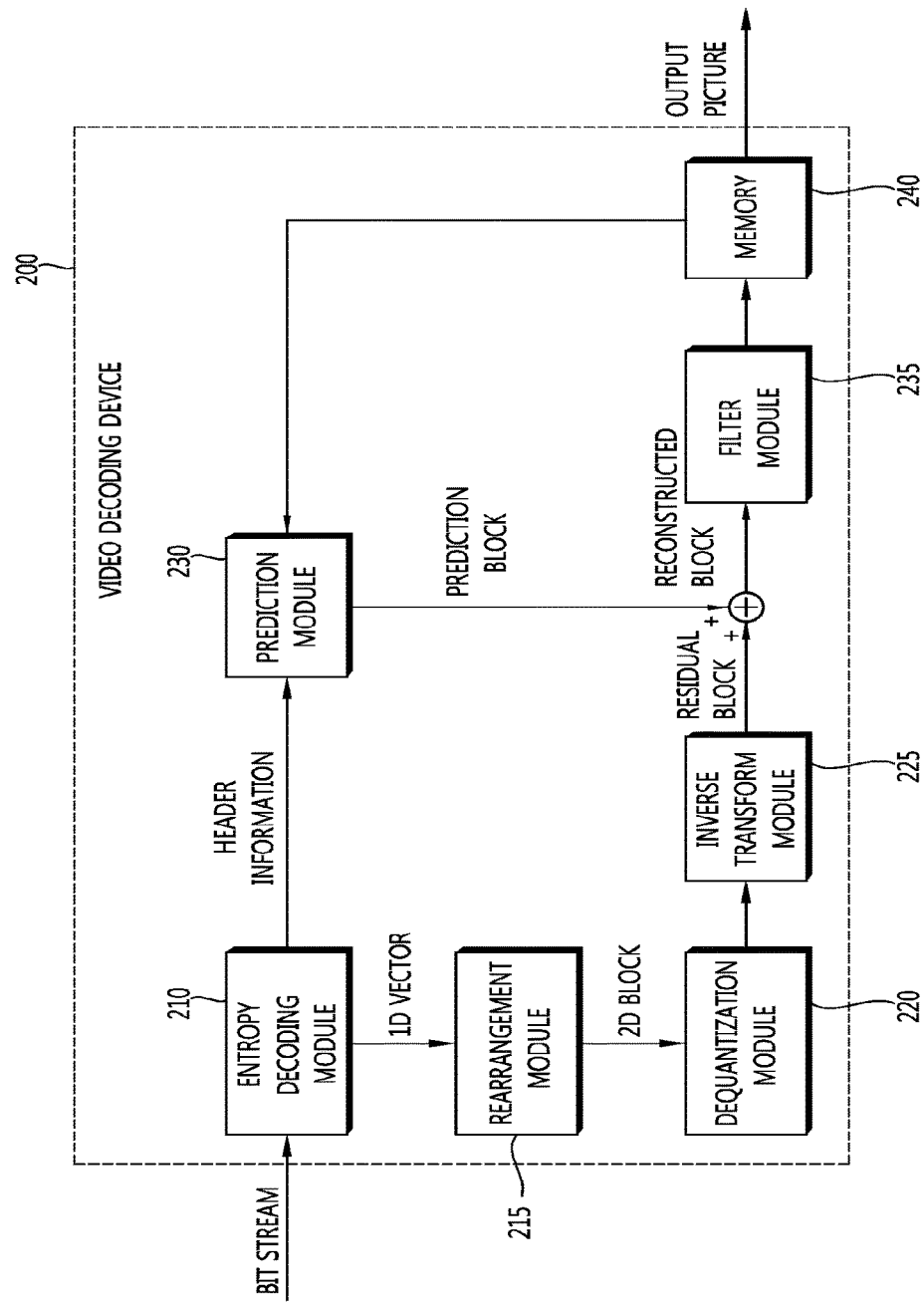
FIG. 2 is a block diagram schematically illustrating a video decoding device (decoder) according to an embodiment of the invention.

FIG. 2 is a block diagram schematically illustrating a video decoding device (decoder) according to an embodiment of the invention. Referring to FIG. 2, a video decoding device 200 includes an entropy decoding module 210, a rearrangement module 215, a dequantization module 220, an inverse transform module 225, a prediction module 230, a filter module 235, and a memory 240.

When a picture bitstream is input from the encoder, the input bitstream is decoded in the inverse order of the order in which video information is processed by the encoder.

For example, when the video encoding device uses a variable length coding (hereinafter, referred to as "VLC") method such as the CAVLC to perform the entropy encoding process, the video decoding module 210 can implement the same VLC table as the VLC table used in the video encoding device and can perform the entropy decoding process. When the video encoding device uses the CABAC to perform the entropy encoding process, the entropy decoding module 210 can perform the entropy decoding process using the CABAC to correspond thereto.

Information for creating a prediction block out of the information decoded by the entropy decoding module 210 is supplied to the prediction module 230, and the residual values entropy-decoded by the entropy decoding module are input to the rearrangement module 215.

The rearrangement module 215 rearranges the bitstream entropy-decoded by the entropy decoding module 210 on the basis of the rearrangement method in the video encoding device. The rearrangement module 215 reconstructs and rearranges coefficients expressed in the form of a one-dimensional vector into coefficients in the form of a two-dimensional block. The rearrangement module 215 is supplied with information associated with the coefficient scanning performed by the encoder and can perform the rearrangement using a method of inversely scanning the coefficients on the basis of the scanning order in which the scanning is performed by the encoder.

The dequantization module 220 performs dequantization on the basis of the quantization parameters supplied from the encoder and the rearranged coefficient values of the block.

The inverse transform module 225 performs the inverse DCT and inverse DST of the DCT and DST, which has been performed by the transform module of the video encoding device, on the quantization result from the video encoding device. The inverse transform is performed on the basis of a transfer unit or a division unit of a picture determined by the video encoding device. The transform module of the video encoding device selectively performs the DCT and DST depending on plural information elements such as the prediction method, the size of the current block, and the prediction direction, and the inverse transform module 225 of the video decoding device performs the inverse transform on the basis of the transform information on the transform performed by the transform module of the video encoding device.

The prediction module 230 creates a prediction block on the basis of prediction block creation information supplied from the entropy decoding module 210 and the previously-decoded block and/or picture information supplied from the memory 240. The reconstructed block can be created using the prediction block created by the prediction module 230 and the residual block supplied from the inverse transform module 225.

The specific prediction method performed by the prediction module 230 is the same as the prediction method performed by the prediction module of the encoder.

When the prediction mode of a current block is an intra prediction mode, an intra prediction process of creating a prediction block can be performed on the basis of pixel information of the current picture.

The prediction modes in the intra prediction include 33 directional prediction modes and at least two non-directional modes. The non-directional modes include a DC prediction mode and a planar mode.

In the intra prediction, a prediction block can be created after a filter is applied to reference samples. At this time, it can be determined whether a filter is applied to reference samples depending on the intra prediction mode and/or the size of the current block.

When the prediction mode for the current block is the inter prediction mode, at least one of a previous picture and a subsequent picture of the current picture is used as a reference picture and the inter prediction process is performed on the current block on the basis of information included in the reference picture. Specifically, in the inter prediction, a reference picture for the current block is selected, a reference block having the same size as the current block is selected, and a prediction block of the current block is created. For example, in the inter prediction, a prediction block can be created so as to minimize the residual signal from the current block and to minimize the magnitude of a motion vector. Information of neighboring blocks of the current picture is used to use the information of the reference picture. For example, the prediction block of the current block is created on the basis of the information of the neighboring blocks through the use of a skip mode, a merge mode, an AMVP (Advanced Motion Vector Prediction) mode, or the like.

The prediction block may be created in the unit of pixel samples less than an integer pixel, such as ½ pixel samples and ¼ pixel samples. Here, a motion vector can also be expressed in the unit of pixel samples less than an integer pixel. For example, luma pixels can be expressed in the unit of ¼ pixels and chroma pixels can be expressed in the unit of ⅛ pixels.

Motion information necessary for the inter prediction of the current block, for example, information on motion vectors, reference picture indices, and the like, can be derived from a skip flag, a merge flag, and the like received from the encoder.

The process unit subjected to the prediction process may be different from the process unit of which the prediction method and the specific details are determined. For example, a prediction mode may be determined in the unit of PU and the prediction process may be performed in the unit of PU. Alternatively, a prediction mode may be determined in the unit of PU and the inter prediction may be performed in the unit of TU.

The residual block output from the inverse transform module 225 is added to the prediction block output from the prediction module 230 to reconstruct an original picture.

The reconstructed block and/or picture is supplied to the filter module 235. The filter module 235 performs a deblocking filtering process, an SAO (Sample Adaptive Offset) process, and/or an adaptive loop filtering process on the reconstructed block and/or picture.

The memory 240 stores the reconstructed picture or block for use as a reference picture or a reference block and supplies the reconstructed picture to the output module.

Although not described for the purpose of convenience for explanation, the bitstream input to the decoder may be input to the entropy decoding module through a parsing step. The parsing step may be performed by the entropy decoding module.

In this specification, coding may be analyzed as encoding or decoding in some cases, and information may be understood to include all of values, parameters, coefficients, elements, and the like.

A "screen" or a "picture" may mean a unit for expressing an image of a specific time zone, and a "slice", a "frame", or the like means a unit constituting a part of a picture in actually coding a video signal and may be mixed with a picture in some cases.

"Pixel" or "pel" may mean the minimum unit constituting an image (a picture). "Sample" can be used as a term representing the value of a specific pixel. A sample can be divided into a luma component and a chroma component and is generally used as a term including both. The chroma component represents a difference between determined colors and generally includes Cb and Cr.

"Unit" is used as a term representing a basic unit of image processing or a specific position of an image, such as a prediction unit (PU) and a transform unit (TU), and can be mixed with terms "block" and "area" case by case. In general cases, a block is used as a term representing a set of samples or transform coefficients arranged in M columns and N rows.

On the other hand, in case of the inter prediction mode, the decoder and the encoder extract the motion information of a current block and perform the inter prediction on the current block on the basis of the extracted motion information.

A picture used for predicting a current block is referred to as a reference picture or a reference frame. The area in the reference picture can be expressed using a reference picture index (refIdx) indicating the reference picture and a motion vector.

A reference picture list for a current picture can be constructed by pictures used for prediction, and a reference picture index indicates a specific reference picture in the reference picture list. The P picture requires a single reference picture list such as reference list 0, and the B picture requires two reference picture lists such as reference list 0 and reference list 1.

Specifically, the I picture is a picture which is encoded/decoded through the intra prediction. The P picture is a picture which can be encoded/decoded through the inter prediction or the intra prediction using at least one motion vector and a reference picture index to predict sample values of blocks. The B picture is a picture which can be encoded/decoded through the inter prediction or the intra prediction using at least two motion vectors and reference picture indices to predict sample values of blocks.

The P picture requires one reference picture list, which is called reference picture list 0 (L0).

The B picture is a picture which can be encoded through forward, backward, and bi-directional inter prediction, for example, using two reference pictures. The B picture requires two reference picture lists, which are called reference picture list 0 (L0) and reference picture list 1 (L1).

The inter prediction using a reference picture selected from L0 is called L0 prediction. The L0 prediction is used mainly for forward prediction. The inter prediction using a reference picture selected from L1 is called L1 prediction. The L1 prediction is used mainly for backward prediction. The inter prediction using two reference pictures selected from L0 and L1 is called bi prediction.

The features of the I picture, the P picture, and the B picture can be defined in the unit of slices, not in the unit of pictures. For example, an I slice having the feature of the I picture in the unit of slices, a P slice having the feature of the P picture, and a B slice having the feature of the B picture can be defined.

For example, when the slice type of a current block is B and a colPic is selected from L0, or when the slice type of a current block is P, a colPic can be selected from L0. A slice (picture) in which reference picture list L0 and reference picture list L1 are equal to each other out of the B slices (B pictures) is called a GPB (Generalized P and B).

As described above with reference to FIGS. 1 and 2, the prediction module performs the intra prediction on the basis of pixel information in a current picture and creates a prediction block of a current block. For example, the prediction module can predict pixel values of the current block using pixels belonging to neighboring blocks of the current block, for example, blocks located on the upper side of the current block, blocks located on the left side of the current block, a block located at the left-top corner of the current block, blocks located on the left-lower side of the current block, and blocks located on the upper-right side of the current block.

In the intra prediction mode, various prediction modes can be used depending on the positions of reference pixels and/or the prediction method used to predict the pixel values of the current block.

Figure 3:
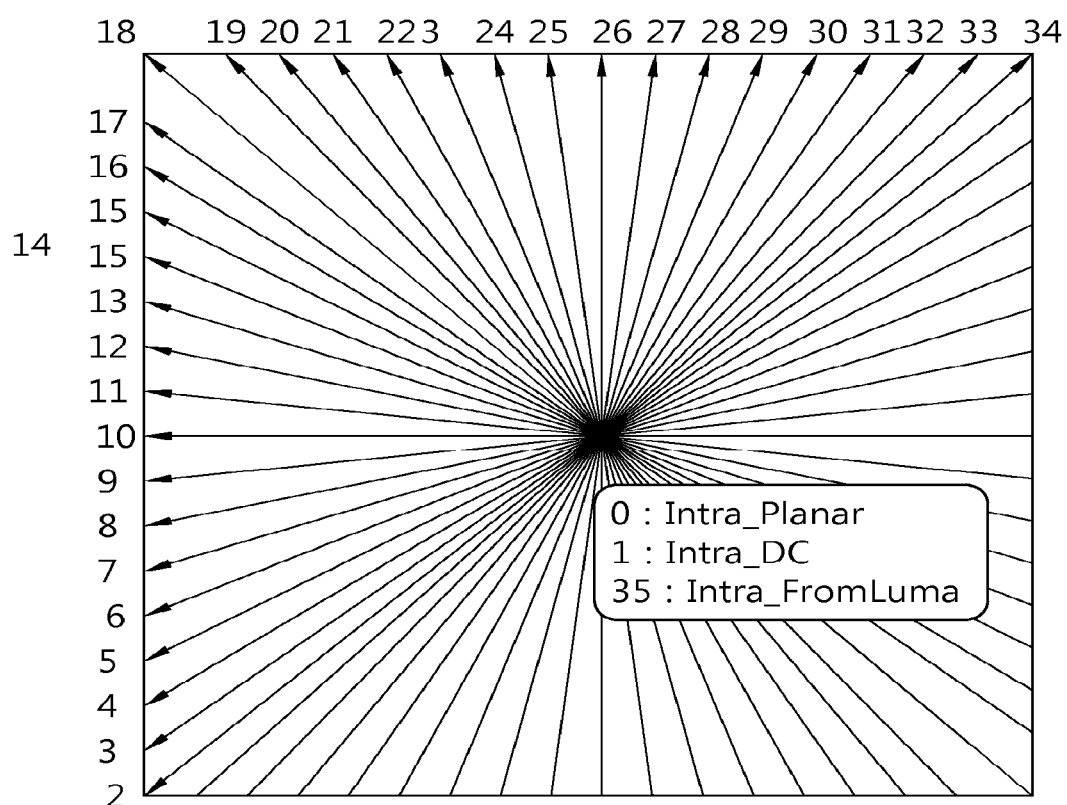
FIG. 3 is a diagram schematically illustrating an example of intra prediction modes used for intra prediction.

FIG. 3 is a diagram schematically illustrating an example of intra prediction modes used for the intra prediction.

Referring to FIG. 3, examples of the intra prediction modes include directional modes such as a vertical mode and a horizontal mode and non-directional modes such as a DC mode and a planar mode.

Table 1 schematically shows indices indicating the intra prediction modes shown in FIG. 3.

TABLE 1

| Intra prediction mode | Title of relevant prediction mode |
| --- | --- |
| 0 | Intra_Planar |
| 1 | Intra_DC |
| Others (2 . . . 34) | Intra_Angular |
| 35 | Intra_FromLuma (used only for chroma) |

In Table 1, numerals 0 to 35 in the intra prediction mode correspond to numerical values of 0 to 35 shown in FIG. 3. Referring to Table 1 and FIG. 3, intra prediction mode 0 represents the planar mode, intra prediction mode 1 represents the DC mode, and both are non-directional modes. Intra prediction modes 2 to 34 represent modes based on prediction angles and are directional modes.

Intra prediction mode 35 as a non-directional mode is applied to only chroma and represents a chroma prediction mode which is determined from a luma intra mode. In the DC mode, a prediction block is created by averaging of the pixel values in a current block. In the angular mode (directional mode), the prediction is performed depending on angles and/or directions determined in advance for the modes.

On the other hand, unlike the luma components, a limited number of prediction modes may be used for the chroma components. For the purpose of convenience for explanation, the limited number of prediction modes used for the chroma components are called chroma prediction mode candidates. When the intra prediction in the chroma mode is performed, the prediction can be performed using one prediction mode of the chroma prediction mode candidates.

For example, the planar mode, the vertical mode, the horizontal mode, and the DC mode can be used as the chroma prediction mode candidates.

Table 2 schematically shows an example where the prediction mode for the chroma components of the current block is determined on the basis of a prediction mode for the luma components of the current block and a prediction mode indicator for the chroma components.

TABLE 2

| intra_chroma_pred_mode | IntraPredMode[xB][yB] | | | | |
|---|---|---|---|---|---|
| | 0 | 26 | 10 | 1 | X (0 <= X < 35) |
| 0 | 34 | 0 | 0 | 0 | 0 |
| 1 | 26 | 34 | 26 | 26 | 26 |
| 2 | 10 | 10 | 34 | 10 | 10 |
| 3 | 1 | 1 | 1 | 34 | 1 |
| 4 | LM | LM | LM | LM | LM |
| 5 | 0 | 26 | 10 | 1 | X |

In Table 2, (xB, yB) represents the position of the top-left luma sample of the current block relative to the top-left sample of the current picture, and IntraPredMode represents the intra prediction mode for the luma samples of the current block. On the other hand, intra_chroma_pred_mode includes information for determining the intra prediction mode for the chroma samples of the current block and can be transmitted from the encoder to the decoder.

The LM mode is also called a linear mode or a mode (luma-estimated mode) estimated from the modes for luma components. In the LM mode, the chroma components of the current block can be predicted using the luma samples (luma pixels) of the current block. For example, in the LM mode, the predicted values of the chroma samples can be created on the basis of the samples created interpolating the reconstructed luma samples of the current block.

Referring to Table 2, the prediction mode for the chroma components of the current block can be determined depending on the value of intra_chroma_pred_mode and the value of the prediction mode IntraPredMode for the luma components of the current block. For example, when the value of intra_chroma_pred_mode is 0 and the value of IntraPredMode is 0, the intra prediction mode for the chroma components of the current block is a prediction mode in the top-right direction (mode 34). When the value of IntraPredMode is not 0, the intra prediction mode for the chroma components of the current block is the planar mode Intra_Planar. The chroma components of the current block are predicted using the chroma components in the current picture depending on the intra prediction mode.

Similarly, when the value of intra_chroma_pred_mode is 1 and the value of IntraPredMode is 26, the intra prediction mode for the chroma components of the current block is a prediction mode in the top-right direction (mode 34). When the value of IntraPredMode is not 26, the intra prediction mode for the chroma components of the current block is the vertical mode, that is, Intra_Angular (26). The chroma components of the current block are predicted using the chroma components in the current picture depending on the intra prediction mode.

When the value of intra_chroma_pred_mode is 2 and the value of IntraPredMode is 10, the intra prediction mode for the chroma components of the current block is a prediction mode in the top-right direction (mode 34). When the value of IntraPredMode is not 10, the intra prediction mode for the chroma components of the current block is a horizontal mode, that is, Intra_Angular(10). The chroma components of the current block are predicted using the chroma components in the current picture depending on the intra prediction mode.

When the value of intra_chroma_pred_mode is 3 and the value of IntraPredMode is 1, the intra prediction mode for the chroma components of the current block is a prediction mode in the top-right direction (mode 34). When the value of IntraPredMode is not 1, the intra prediction mode for the chroma components of the current block is the DC mode Intra_DC. The chroma components of the current block are predicted using the chroma components in the current picture depending on the intra prediction mode.

When the value of intra_chroma_pred_mode is 4, the intra prediction mode for the chroma components of the current block is the LM mode. Therefore, the prediction block for the chroma components of the current block can be created using the reconstructed luma components of the current block.

When the value of intra_chroma_pred_mode is 5, the intra prediction mode for the chroma components of the current block is the same as the intra prediction mode for the luma components of the current block. Therefore, this case is called a DM (Direct Mode).

Table 3 schematically shows another example where the prediction mode for the chroma components of the current block is determined on the basis of a prediction mode for the luma components of the current block and a prediction mode indicator for the chroma components.

TABLE 3

| intra_chroma_pred_mode | IntraPredMode[xB][yB] | | | | |
|---|---|---|---|---|---|
| | 0 | 26 | 10 | 1 | X (0 <= X < 35) |
| 0 | 34 | 0 | 0 | 0 | 0 |
| 1 | 26 | 34 | 26 | 26 | 26 |
| 2 | 10 | 10 | 34 | 10 | 10 |
| 3 | 1 | 1 | 1 | 34 | 1 |
| 4 | 0 | 26 | 10 | 1 | X |

Table 3 shows a case where the LM mode is not applied.

The decoder may selectively apply Table 2 and Table 3. For example, the encoder can transmit information indicating which of Table 2 and Table 3 to apply to the decoder. The decoder can apply Table 2 or Table 3 to determine the intra prediction mode for the chroma components of the current block in response to the transmitted instruction.

On the other hand, video information including the predicted information is subjected to the entropy encoding and is then transmitted with a bitstream to the decoder as described with reference to FIG. 1. As described with reference to FIG. 2, the decoder obtains video information including the predicted information by entropy-decoding the received bitstream.

Figure 4:
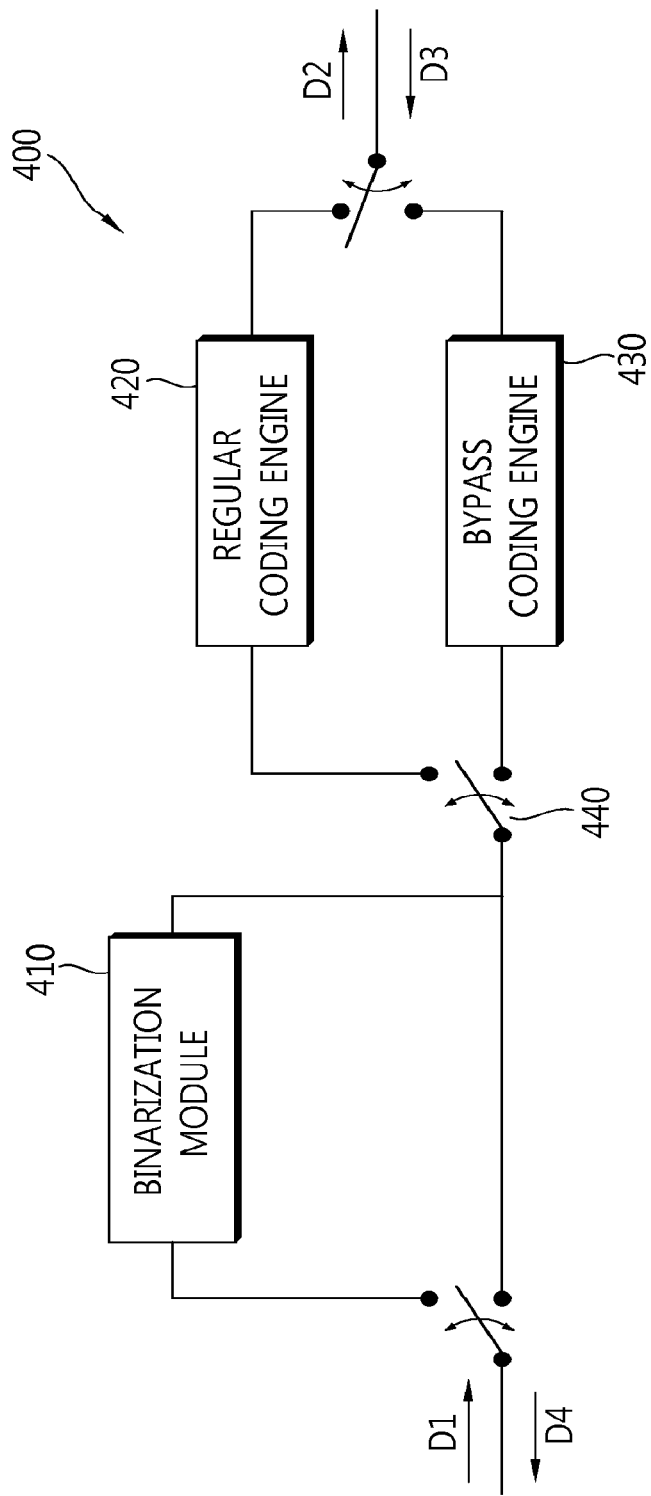
FIG. 4 is a diagram schematically illustrating an example of entropy coding according to the invention.

FIG. 4 is a diagram schematically illustrating an example of the entropy coding module according to the invention. The configuration of the entropy coding module shown in FIG. 4 can be similarly applied to the entropy encoding and the entropy decoding.

When FIG. 4 shows an example of the entropy encoding module, the entropy encoding module 400 includes a binarization module 410, a regular coding engine 420, and a bypass coding engine 430.

Here, the entropy-encoding processes a signal input in the direction of D1 and outputs the processed signal in the direction of D2.

When the input signal is not a binary value but a syntax element, the binarization module 410 converts the input signal into a binary number. When the input signal is a binary number, the input signal may bypass the binarization module 410.

A binary value which is an input single digit value is called a bin. For example, when the input binary value is 110, each of 1, 1, and 0 is called a bin and a binary sequence including the bins is called a bin string.

The binarized signal (bin string) is input to the regular coding engine 420 or the bypass coding engine 430.

The regular coding engine 420 allocates context reflecting a probability value to the bin and encodes the bins on the basis of the allocated contexts. The regular coding engine 420 can update the context of the bin after encoding the bin.

The bypass coding engine 430 does not allocate contexts depending on the input bins, but encodes the input bins in a simple bypass mode to raise the encoding rate. In the bypass mode, the procedure of estimating the probabilities for the input bins and the procedure of updating the probabilities applied to the bins after the encoding are bypassed. In the bypass mode, for example, the encoding procedure can be performed using a uniform probability distribution.

The entropy encoding module 400 determines whether the entropy encoding is performed through the use of the regular coding engine 420 or whether the entropy encoding is performed through the use of the bypass coding engine 430, and switches the encoding route through the use of the switching module 440.

The entropy encoding module 400 may be the entropy encoding module 130 shown in FIG. 1.

When FIG. 4 shows an example of the entropy decoding module, the entropy decoding module 400 includes a binarization module 410, a regular coding engine 420, and a bypass coding engine 430.

The entropy decoding module 400 processes a signal input in the direction of D3 and outputs the processed signal in the direction of D4.

The binarization module 410, the regular coding engine 420, and the bypass coding engine 430 perform the same procedures as described in the entropy encoding module in the reversed order.

For example, the entropy decoding module 400 determines whether the bin of the input syntax element is decoded through the use of the regular coding engine 420 or through the use of the bypass coding engine 430.

When it is determined that the regular coding engine is used, the regular coding engine 420 performs the decoding using contexts. When it is determined that the bypass coding engine is used, the bypass coding engine 430 performs the decoding using the uniform probability distribution. A binary code is output by the decoding in the coding engines 420 and 430.

When all the bins of a specific syntax (syntax element) are completely decoded by the coding engine, the binary codes output for all the bins of the syntax (syntax element) are summed and it is determined onto what syntax value the sum is mapped. When the output final binary code is mapped onto a specific syntax, the value of the binary code is determined to be the value of the mapped syntax.

At this time, the binarization module 410 can perform inverse binarization if necessary.

On the other hand, the decoder entropy-decodes the bitstream received from the encoder. Hereinafter, an entropy-decoding method which is performed by the decoder when the encoder entropy-encodes video information using the CABAC as an example of the entropy decoding according to the invention for the purpose of convenience for explanation will be described.

The decoder, for example, the entropy decoding module of the decoder, starts a CABAC parsing procedure in response to a request for the value of the syntax element, when parsing the syntax element encoded in the CABAC.

specifically, binarization of the value of the syntax element is derived in response to a request for the value of the syntax element. In the course of binarization, the binarization is performed depending on the applied binarization type (for example, unary binarization, truncated unary binarization, Exp-Golomb binarization, and fixed length binarization.

The binarization of the syntax element and the sequence of the parsed bins determine the decoding process. The bin of the binarized value of the syntax element is indexed by bin index binIdx, and context index ctxIdx of the bin is derived. The initial value of the context index can be set by the syntax element. In this case, a context index table in which the values of context indices are set by the syntax elements can be used, and the table can be specified using a predetermined indicator, for example, a context index table indicator ctxIdxTable.

An arithmetic decoding process is started for each context index.

Figure 5:
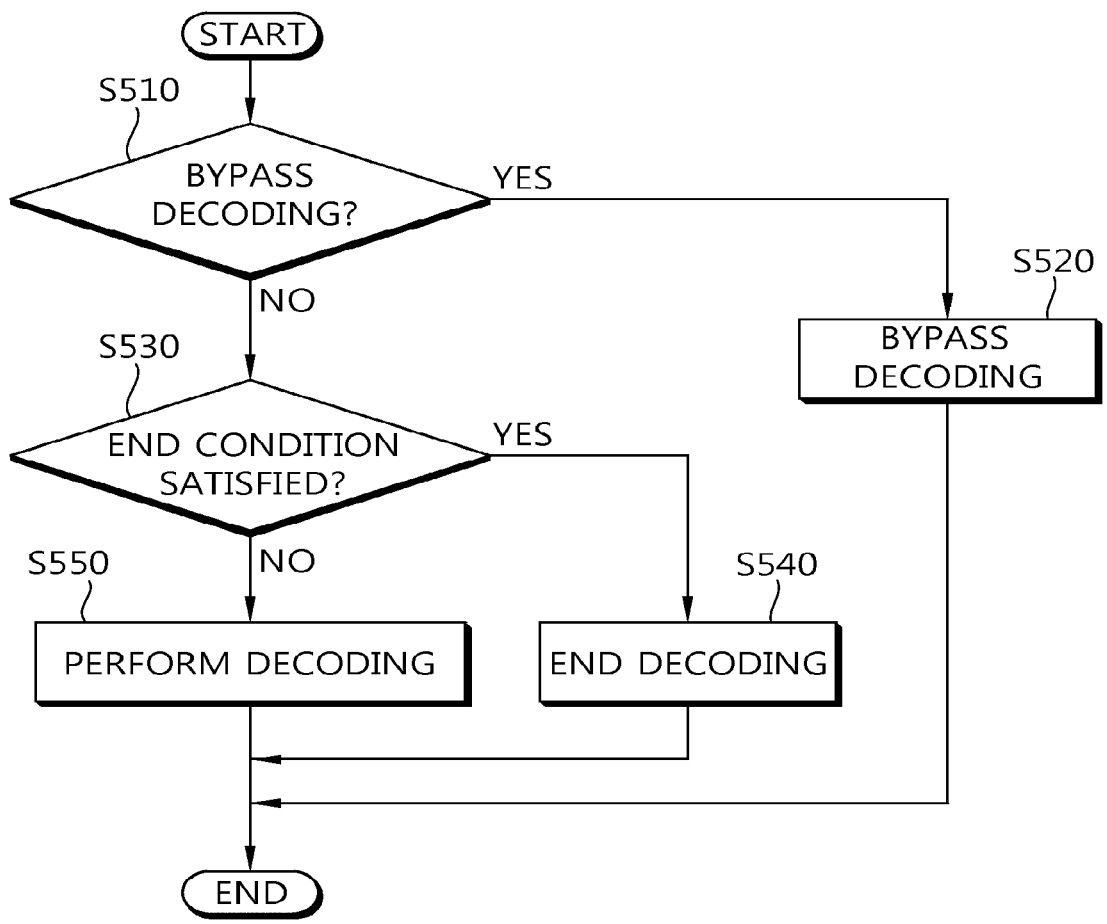
FIG. 5 is a flowchart schematically illustrating an example of an entropy decoding procedure according to the invention.

FIG. 5 is a flowchart schematically illustrating an example of the entropy decoding process according to the invention. For the purpose of convenience for explanation, a decoding process on a single bin is illustrated an example in FIG. 5.

The decoding process shown in FIG. 5 can be performed by the decoder, specifically, the entropy decoding module in the decoder. Here, for the purpose of convenience for explanation, it is assumed that the entropy decoding module performs the process steps.

Referring to FIG. 5, the entropy decoding module determines whether bypass decoding is applied to the input bin to be decoded (S510). The entropy decoding module can determine whether the bypass decoding is applied on the basis of information on the bin to be decoded. For example, as described later, when fixed contexts are used using a table, the entropy decoding module may determine whether the bypass decoding is applied on the basis of an instruction allocated to the syntax element in the table. When the fixed contexts are used using a table, the entropy decoding module may determine whether the bypass decoding is applied on the basis of indices, offsets, and the like allocated to the syntax element in the table.

When it is determined that the bypass decoding is applied, the entropy decoding module performs the bypass decoding on the input bin (S520). Similarly to the encoding, a uniform probability distribution is used to perform the bypass decoding. The entropy decoding module can compare a code interval range codIRange and a code interval offset codIOffset depending on the state of the bypass decoding engine and can allocate the values of the bins thereto. For example, 1 is allocated as the value of the bin when the code interval offset is equal to or larger than the code interval range, and 0 is allocated as the value of the bin when the code interval offset is smaller than the code interval range. At this time, in order to directly compare the code interval range and the code interval offset, the value of the code interval range or the code interval offset may be appropriately adjusted.

When it is determined in step S510 that the bypass decoding is not performed, the entropy decoding module determines whether a decoding end condition is satisfied (S530). For example, when the value of a context index ctxIdx is 0 and the value of a context index table ctxIdxTable is 0, the entropy decoding module ends the decoding process. Whether the end condition is satisfied may not be determined depending on the index values but syntax information such as a flag may be transmitted from the encoder. At this time, the end condition indicated by the syntax information and the end condition determined depending on the index values may be equal to each other.

When the end condition is satisfied, the entropy decoding module ends the decoding process as described above (S540). Then entropy decoding module may allocate a predetermined set value as the value of the bin before the ending. At this time, the entropy decoding module may allocate the value of the bin through the bypass decoding.

When the end condition is not satisfied, the entropy decoding module performs the decoding (S550). The entropy decoding module decodes the bins to be decoded on the basis of the bin index binIdx indicating the bin to be decoded and the context index ctxIdx indicating the context applied to the bin to be decoded.

Hereinafter, the method of performing decoding using contexts will be described in detail.

As described above, when video information requiring high coding efficiency is processed, entropy coding (entropy encoding/entropy decoding) can be used. In addition to the basic coding methods such as Exp-Golomb, a variable length coding (VLC) or the above-mentioned context-based adaptive binary arithmetic coding (CABAC) can be used for the entropy coding.

In the CABAC, "context-based" means that a coding method having higher efficiency is adaptively selected and applied in consideration of circumstances. In this regard, use of different contexts means that different probability models are applied for the coding through the use of independent context update.

The following methods can be preferentially considered as the method of using contexts for the coding in the CABAC.

<Method of Using Context>

(a) Method of calculating contexts depending on the circumstances and adaptively using the calculated context for the coding.

(b) Method of defining a specific context table in advance so as to use fixed contexts and using context designated in the defined table.

(c) Bypass coding (encoding/decoding) method of coding (encoding/decoding) a binary code without referring to contexts.

(d) Method of selectively combining and using the methods of (a) to (c).

The method of (1) out of the context using methods accompanies with a process of calculating a context in consideration of circumstances before the coding and thus has the highest complexity. The encoder can calculate a context for each bin of the binary code of the syntax element to be coded in consideration of the circumstances, for example, the contexts applied to the previous and subsequent bins or the contexts of the block (for example, the left block or the top block) coded earlier than the current block. The encoder transmits information on the calculated contexts to the decoder. The decoder decodes the bin on the basis of the received context information.

Instead of causing the encoder to determine and transmit the contexts of the bins, the encoder and the decoder may calculate the contexts in consideration of the circumstances using the same method.

The method of (b) out of the context using methods is a method of setting a context table in which context indices are allocated to the bins of the binary code of a specific syntax element in advance and using the context indicated by the context index allocated in the context table to decode the corresponding bin, instead of calculating the context every time as in the method of (a). When the method of (b) is used, fixed contexts may be used for the bins.

Table 4 schematically shows an example where bin indices and context indices are designated when the method of (b) is used.

TABLE 4

| Syntax element | Bin index (binIdx) | | | | |
|---|---|---|---|---|---|
| | 0 | 1 | 2 | 3 | 4 |
| Context index by bin | Idx0 | Idx1 | Idx2 | Idx3 | Idx4 |

Table 4 shows an example of a context table applied to a specific syntax element when the specific syntax element is assumed.

In the example of Table 4, the bin index binIdx indicates a specific bin out of the bins constituting the binary code of a syntax element. For example, the value of binIdx of 0 indicates the 0-th bin of the bins constituting the binary code of the syntax element, and the value of binIdx of 4 indicates the third bin of the bins constituting the binary code of the syntax element. The syntax element may be a syntax element which is transmitted from the encoder to the decoder, such as merge_idx, intra_chroma_pred_mode, and inter_pred_flag.

Referring to Table 4, context indices are allocated to bins 0 to 4 constituting the binary code of a syntax element. The context indices Idx0 to Idx4 may have different values. The context indices indicate context to be applied to the bin. The contexts indicated by the context indices are allocated in a particular table. For example, in particular context tables by syntax elements, a specific context indicated by a context index may be allocated.

The bins of the syntax element are decoded on the basis of the contexts indicated by the allocated context indices.

When the syntax element is decoded, the decoder uses a context indicated by the context index allocated to a specific bin for the corresponding bin. For example, when the value of the bin index is 0, the 0-th bin can be decoded using the context indicated by Idx0.

Table 4 shows a case where the maximum value of the bin indices binIdxMax is 4, but the maximum value of the bin indices may be larger than 4 or may be smaller than 4. The same context index as the context index allocated to the maximum bin index binIdxMax can be used for the bin index larger than the maximum value.

The method of (c) of the context using methods has complexity higher than that of the method of (a) or (b). The bypass coding used in the method of (c) uses a uniform probability distribution as described above and is applied for rapid coding. Details of the bypass coding are the same as described above.

In CABAC coding of a specific binary code, a context is applied to the numeral 0 or 1 of each digit of the binary code. At this time, numeral 0 or 1 of each digit of the binary code is called a bin as described above. For example, when the binary code is 110, the 0-th bin is 1, the first bin is 1, and the second bin is 0.

In the CABAC coding, contexts for the bins constituting the binary code of the syntax element can be determined in various ways.

<Method of Determining Context for a Bin Constituting Binary Code>

(A) Independent contexts may be applied to each of the bins constituting the binary code of a syntax element.

(B) The same context may be commonly applied to the bins constituting the binary code of the syntax element.

(C) The bins constituting the binary code of the syntax element may be coded (bypass-coded) in the bypass mode.

(D) The methods of (A) to (C) can be combined to determine contexts for the bins constituting the binary code of the syntax element.

In the method of (A), independent contexts may be applied to each of the bins constituting the binary code of the syntax element. Therefore, the context for the bin can be independently updated. In the method of (B), the same context may be applied to the bins constituting the binary code and can be updated in the same way. In the method of (C), since all the bins constituting the binary code are coded in the bypass mode, rapid decoding can be achieved.

According to the method of (D), the methods of (A) to (C) can be combined and applied. For example, independent contexts may be applied to some bins of the bins constituting the binary code of the syntax element and the same context may bes applied to some bins. Independent contexts may be applied to some bins of the bins constituting the binary code of the syntax element and the bypass mode may be applied to some bins. The same context may be applied to some bins of the bins constituting the binary code of the syntax element and the bypass mode may be applied to some bins. Independent contexts may be applied to some bins of the bins constituting the binary code of the syntax element, the same context may be applied to some bins, and the bypass mode may be applied to some bins.

On the other hand, the context determining methods (A) to (D) for the bins constituting the binary code of the syntax element may be applied along with the context using methods (a) to (d).

For example, on the basis of the method of (A), independent contexts may be applied to all the bins constituting the binary code of a specific syntax (syntax element) and the applied independent context can be calculated in consideration of the circumstances of the bin to be applied.

In a specific syntax (syntax element), independent contexts may be applied to all the bins constituting the binary code of the corresponding syntax (syntax element) and the applied independent contexts may be indicated by a predetermined context table.

Table 5 shows an example where contexts are allocated using a predetermined context table when independent contexts are allocated to the bins constituting the binary code of a syntax element.

TABLE 5

| | Bin index (binIdx) | | | | |
|---|---|---|---|---|---|
| Syntax element A | 0 | 1 | 2 | 3 | 4 |
| Context index by bin | Idx0 | Idx1 | Idx2 | Idx3 | Idx4 |

Table 5 shows an example of a context table applied to specific syntax element A when the syntax element A is assumed.

In Table 5, context indices by bins Idx0 to Idx4 independently indicate contexts to be applied to the bins, and the context indicated by the context index can be independently updated.

Table 5 shows an example where the maximum value of the bin indices binIdxMax is 4, but the maximum value of the bin indices may be larger than 4 or may be smaller than 4. The same context index as the context index allocated to the maximum bin index binIdxMax can be used for the bin index larger than the maximum value.

On the other hand, independent contexts are applied to some bins of the bins constituting the binary code of a specific syntax (syntax element) and the bypass mode is applied to some bins.

At this time, when context is applied to the corresponding bin, the context applied to the bin can be calculated in consideration of the circumstances.

In a predetermined context table, independent contexts or the bypass mode may be set by bins, and it may be indicated what context to apply or whether to apply the bypass mode by the context indices by bins.

Table 6 shows an example of a context table which can be used in a case where independent contexts are applied to some bins of the bins constituting the binary code of a specific syntax (syntax element) and the bypass mode is applied to some bins.

TABLE 6

| | Bin index (binIdx) | | | | |
|---|---|---|---|---|---|
| Syntax element B | 0 | 1 | 2 | 3 | 4 |
| Context index by bin | Idx0 | bypass | Idx1 | bypass | Idx2 |

Table 6 shows an example of a context table applied to specific syntax element B when the syntax element B is assumed.

In the example of Table 6, independent contexts are applied to the 0-th, second, and fourth bins of the bins constituting the binary code of syntax element B and the bypass mode is applied to the first and third bins.

Table 6 shows an example where the maximum value of the bin indices binIdxMax is 4, but the maximum value of the bin indices may be larger than 4 or may be smaller than 4. The same context index as the context index allocated to the maximum bin index binIdxMax can be used for the bin index larger than the maximum value.

On the basis of the methods of (A) and (B), independent contexts may be applied to some bins of the bins constituting the binary code of a specific syntax (syntax element), the same context may be commonly applied to some bins, and the context may be calculated in consideration of the circumstances of the bin to be applied.

In a specific syntax (syntax element), independent contexts may be applied to some bins of the bins constituting the binary code of the corresponding syntax (syntax element), the same context may be commonly applied to some bins, and the contexts may be indicated by a predetermined context table.

Table 7 shows an example where contexts are applied using a context table in a case where independent contexts are applied to some bins of the bins constituting the binary code of a syntax element and the same context is commonly applied to some bins.

TABLE 7

| | Bin index (binIdx) | | | | |
|---|---|---|---|---|---|
| Syntax element C | 0 | 1 | 2 | 3 | 4 |
| Context index by bin | Idx0 | Idx1 | Idx1 | Idx2 | Idx3 |

Table 7 shows an example of a context table applied to specific syntax element C when the syntax element C is assumed.

In Table 7, the same context indicated by the context index Idx1 is applied to the first and second bins. Contexts indicated by the context indices Idx1, Idx2, and Idx3 are applied to the 0-th, third, and fourth bins. The context indices Idx0 to Idx3 may have different values and the context indicated by the context index can be independently updated.

Table 7 shows an example where the maximum value of the bin indices binIdxMax is 4, but the maximum value of the bin indices may be larger than 4 or may be smaller than 4. The same context index as the context index allocated to the maximum bin index binIdxMax can be used for the bin index larger than the maximum value.

On the other hand, in a specific syntax (syntax element), independent contexts may be applied to some bins of the bins constituting the binary code of the corresponding syntax (syntax element), the same context may be commonly applied to some bins, and the bypass mod may be applied to some bins.

At this time, when context is applied to the corresponding bin, the context applied to the bin can be calculated in consideration of the circumstances. In a predetermined context table, independent contexts or the bypass mode may be set by bins, and it may be indicated what context to apply or whether to apply the bypass mode by the context indices by bins.

Table 8 shows an example of a context table which can be used in a case where independent contexts are applied to some bins of the bins constituting the binary code of a specific syntax (syntax element), the same context is commonly applied to some bins, and the bypass mode is applied to some bins.

TABLE 8

|  | Bin index (binIdx) | | | | |
| --- | --- | --- | --- | --- | --- |
|  | 0 | 1 | 2 | 3 | 4 |
| Syntax element D |  |  |  |  |  |
| Context index by bin | Idx0 | bypass | Idx1 | Idx2 | Idx2 |

Table 8 shows an example of a context table applied to specific syntax element D when the syntax element D is assumed.

In Table 8, the context indicated by the context index Idx0 is applied to the 0-th bin of the bins constituting the binary code of syntax element D, the bypass mode is applied to the first bin, the context indicated by the context index Idx1 is applied to the second bin, and the context indicated by the context index Idx2 is applied to the third bin and the fourth bin.

Table 8 shows an example where the maximum value of the bin indices binIdxMax is 4, but the maximum value of the bin indices may be larger than 4 or may be smaller than 4. The same context index as the context index allocated to the maximum bin index binIdxMax can be used for the bin index larger than the maximum value.

On the basis of the method of (B), the same context may be commonly applied to the bins constituting the binary code of a specific syntax (syntax element). At this time, the common context can be calculated in consideration of the circumstances at the time of application to the bins. The common context may be allocated using a predetermined context table constructed in advance.

Table 9 shows an example of a context table which can be used in a case where the same context is applied to the bins constituting the binary code of a specific syntax (syntax element).

TABLE 9

|  | Bin index (binIdx) | | | | |
| --- | --- | --- | --- | --- | --- |
|  | 0 | 1 | 2 | 3 | 4 |
| Syntax element E |  |  |  |  |  |
| Context index by bin | Idx0 | Idx0 | Idx0 | Idx0 | Idx0 |

Table 9 shows an example of a context table applied to specific syntax element E when the syntax element E is assumed.

In Table 9, the context indicated by the context index Idx0 is commonly applied to the bins constituting the binary code of syntax element E.

Table 9 shows an example where the maximum value of the bin indices binIdxMax is 4, but the maximum value of the bin indices may be larger than 4 or may be smaller than 4. The same context index as the context index allocated to the maximum bin index binIdxMax can be used for the bin index larger than the maximum value.

In a specific syntax (syntax element), the same context may be applied to some bins of the bins constituting the binary code of the corresponding syntax (syntax element) and the bypass mode may be applied to some bins.

At this time, when context is applied to the corresponding bin, the context can be calculated in consideration of the circumstances. In a predetermined context table constructed in advance, the common context or the bypass mode may be set for some bins, and the context or the bypass mode may be indicated by the context indices.

Table 10 shows an example of a context table which can be used in a case where the same context is applied to some bins of the bins constituting the binary code of a specific syntax (syntax element) and the bypass mode is applied to some bins.

TABLE 10

|  | Bin index (binIdx) | | | | |
| --- | --- | --- | --- | --- | --- |
|  | 0 | 1 | 2 | 3 | 4 |
| Syntax element F |  |  |  |  |  |
| Context index by bin | Idx0 | Idx0 | bypass | Idx0 | Idx0 |

Table 10 shows an example of a context table applied to specific syntax element F when the syntax element F is assumed.

In Table 10, the bypass mode is applied to the second bin of the bins constituting the binary code of syntax element F and the context indicated by the context index Idx0 is applied to the 0-th, first, third, and fourth bins.

Table 10 shows an example where the maximum value of the bin indices binIdxMax is 4, but the maximum value of the bin indices may be larger than 4 or may be smaller than 4. The same context index as the context index allocated to the maximum bin index binIdxMax can be used for the bin index larger than the maximum value.

On the basis of the method of (C), the bypass mode may be applied to all the bins constituting the binary code of a specific syntax (syntax element). In this case, the application of the bypass mode to the corresponding syntax (syntax element) can be indicated using a context table constructed in advance. At this time, the context table can be constructed in such a manner that the bypass mode is allocated to all the bin indices.

In the bins constituting the binary code of a specific syntax (syntax element), different contexts may be applied to the same bin. For example, plural different context indices may be allocated to the same bin index in the context table.

The context index may vary depending on the circumstances (state or condition) in which the syntax (syntax element) is applied. For example, depending on the states or conditions such as the type of a block to which the syntax (syntax element) is applied, the type of a picture (slice, frame), a prediction mode, a block size, and a block depth, different contexts may be applied to the bin at the same position in the binary code. At this time, a certain state may be specified by another equivalent state. For example, the block size may be specified by the block depth, or the block depth may be specified by the block size. Therefore, two conditions may be a state or condition for specifying the same circumstance.

When a common context is applied to different contexts are applied depending on the picture (slice, frame) type, different context indices can be allocated to the same bin index depending on whether a picture (slice, frame) is an I picture (slice, frame), a P picture (slice, frame), or a B picture (slice, frame).

Hereinafter, a case where different contexts (context indices) can be applied to the same bin index will be specifically described.

A syntax element can has a binary code (codeword) value including predetermined bins as described above. For example, in case of the intra prediction for chroma components, 5 or 6 prediction modes are allowed depending on whether the LM mode is applied, as described with reference to Tables 2 and 3. Therefore, the syntax element intra_chroma_pred_mode indicating the intra prediction for the chroma components can have 5 to 6 different binary code (codeword) values.

Table 11 shows intra prediction modes which can be used for prediction of the chroma components and binary codes (codewords) of the syntax element intra_chroma_pred_mode indicating the intra prediction modes when the LM mode is used.

Table 12 shows intra prediction modes which can be used for prediction of the chroma components and binary codes (codewords) of the syntax element intra_chroma_pred_mode indicating the intra prediction modes when the LM mode is not used.

TABLE 11

| Mode indices | codeword |
| --- | --- |
| 0 | 0 |
| 1 | 10 |
| 2 | 110 |
| 3 | 1110 |
| 4 | 11110 |
| 5 | 11111 |

TABLE 12

| Mode Indices | codeword |
| --- | --- |
| 0 | 0 |
| 1 | 10 |
| 2 | 110 |

TABLE 12-continued

| Mode Indices | codeword |
| --- | --- |
| 3 | 1110 |
| 4 | 1111 |

As shown in Table 11 or 12, contexts can be allocated to the bins constituting binary codes (codewords) of a predetermined syntax element in the above-mentioned way.

The context table can be used for the bins constituting a codeword so as to apply different contexts to the same bin depending on the state or condition. In this case, a context applied to a specific bin can be indicated by the sum of the index values allocated to the bin indices and the offset value added thereto depending on the condition in the context table. Accordingly, in this case, the indicator indicating the context can be said to be the sum of the offset value and the index value indicated by each bin index. For the purpose of convenience for explanation, the index value indicated by the corresponding bin is called a context index by bin and the index indicating the context to be applied to the corresponding bin is called a context index for bin (ctxIdx).

Table 13 shows an example of a context table which can be used in a case where the state information or the condition is reflected in the same bin and different contexts are applied thereto.

TABLE 13

| Offset | Context index by bin | | | | |
| --- | --- | --- | --- | --- | --- |
| | 0 | 1 | 2 | 3 | 4 |
| A1 | B0 | B1 | B2 | B3 | B4 |
| A2 | B0 | B1 | B2 | B3 | B4 |
| A3 | B0 | B1 | B2 | B3 | B4 |

In Table 13, numerals 0 to 4 represent bin index values (binIdx). The offset values A1, A2, and A3 may be different from each other as in an example to be described later. All or some of the context indices by bin, that is, the indices (context indices by bin) B0, B1, B2, B3, and B4 allocated by bin indices, may have different values.

Table 13 shows an example where the maximum value of the bin indices binIdxMax is 4, but the maximum value of the bin indices may be larger than 4 or may be smaller than 4. The same context index as the context index allocated to the maximum bin index binIdxMax can be used for the bin index larger than the maximum value.

As described above, the offset value can be set depending on a predetermined state or condition. For example, when the offset value is set depending on the picture (slice, frame) type, A1 may be an offset for the I picture (slice, frame), A2 may be an offset for the P picture (slice, frame), and A3 may be an offset for the B picture (slice, frame).

The offset value may be determined directly from the state information or the condition such as the picture (slice, frame) or may be determined using a parameter value such as a predetermined type value determined depending on the state information or the condition such as the picture (slice, frame) type.

By using the offset value, different contexts can be allocated to the bins with reflection of the state information or the condition. When Table 13 is assumed for a predetermined syntax (syntax element), the values of A1, A2, and A3 are different from each other, and the values of B0, B1, B2, B3, and B4 are different from each other, different contexts can be allocated to the bins constituting a codeword (binary code) of a predetermined syntax (syntax element).

Table 14 shows an example of a context table which can be used in a case where the offset value is set differently depending on the picture (slice, frame) and different contexts are allocated to the bins.

TABLE 14

| | | Context index by bin | | | | |
|---|---|---|---|---|---|---|
| Type | Offset | 0 | 1 | 2 | 3 | 4 |
| I | 0 | 0 | 1 | 2 | 3 | 4 |
| P | 5 | 0 | 1 | 2 | 3 | 4 |
| B | 10 | 0 | 1 | 2 | 3 | 4 |

Table 14 shows an example where the offset value and the context index value by bin in Table 13 are specifically set. The offset values and the context index values by bin in Table 14 can be set to be different from the values shown in Table 14 so as to indicate suitable contexts.

By applying different offsets depending on the state information or the condition, different contexts depending on the condition may be allocated and the same context may be commonly applied to some bins of the bins constituting a codeword of a syntax (syntax element). For example, when Table 13 is assumed for a predetermined syntax (syntax element), some of the values of B0, B1, B2, B3, and B4 can be set to have the same value.

Table 15 shows an example of a context table which can be used in a case where the offset value is set differently depending on the picture (slice, frame) and the same context is commonly applied to some bins of the bins constituting a codeword of a syntax (syntax element).

TABLE 15

| | | Context index by bin | | | | |
|---|---|---|---|---|---|---|
| Type | Offset | 0 | 1 | 2 | 3 | 4 |
| I | 0 | 0 | 1 | 1 | 2 | 3 |
| P | 4 | 0 | 1 | 1 | 2 | 3 |
| B | 8 | 0 | 1 | 1 | 2 | 3 |

Table 15 shows an example where the offset value and the context index value by bin in Table 13 are specifically set. The offset values and the context index values by bin in Table 15 can be set to be different from the values shown in Table 15 so as to indicate suitable contexts.

By applying different offsets depending on the state information or the condition, different contexts depending on the condition may be allocated, independent contexts may be applied to some bins of the bins constituting a codeword of a syntax (syntax element), the same context may be commonly applied to some bins, and the bypass mode may be applied to some bins. For example, when Table 13 is assumed for a predetermined syntax (syntax element), some of the values of B0, B1, B2, B3, and B4 can be set to have the same value and some of the values of B0, B1, B2, B3, and B4 can be set to indicate the bypass mode instead of the specific index values.

Table 16 shows an example of a context table which can be used in a case where the offset value is set so as to define different contexts depending on the slice type, independent contexts are applied to some bins, the same context is commonly applied to some bins, and the bypass mode is applied to some bins.

TABLE 16

| | | Context index by bin | | | | |
|---|---|---|---|---|---|---|
| Type | Offset | 0 | 1 | 2 | 3 | 4 |
| I | 0 | 0 | 1 | 1 | 1 | bypass |
| P | 2 | 0 | 1 | 1 | 1 | bypass |
| B | 4 | 0 | 1 | 1 | 1 | bypass |

When Table 16 is assumed to be applied to a predetermine syntax (syntax element), 0 is allocated as the context index by bin to the 0-th bin constituting the codeword of the corresponding syntax (syntax element) and 1 is allocated as the context index by bin to the first to third bins. The bypass mode is applied to the fourth bin.

Table 16 shows an example where the offset value and the context index value by bin in Table 13 are specifically set. The offset values and the context index values by bin in Table 16 can be set to be different from the values shown in Table 16 so as to indicate suitable contexts.

By applying different offsets depending on the state information or the condition, different contexts depending on the condition may be allocated, contexts may be applied to some bins of the bins constituting a codeword of a syntax (syntax element), and the bypass mode may be applied to the other bins. For example, when Table 13 is assumed for a predetermined syntax (syntax element), some of the values of B0, B1, B2, B3, and B4 can be set to index values and the other of the values of B0, B1, B2, B3, and B4 can be set to indicate the bypass mode instead of the specific index values.

Table 17 shows an example of a context table which can be used in a case where the offset value is set so as to define different contexts depending on the slice type, contexts are applied to some bins, and the bypass mode is applied to the other bins.

TABLE 17

| | | Context index by bin | | | | |
|---|---|---|---|---|---|---|
| Type | Offset | 0 | 1 | 2 | 3 | 4 |
| I | 0 | 0 | bypass | bypass | bypass | bypass |
| P | 1 | 0 | bypass | bypass | bypass | bypass |
| B | 2 | 0 | bypass | bypass | bypass | bypass |

When Table 17 is assumed to be applied to a predetermine syntax (syntax element), 0 is allocated as the context index by bin to the 0-th bin constituting the codeword of the corresponding syntax (syntax element) and the bypass mode is applied to the first to fourth bins.

Table 17 shows an example where the offset value and the context index value by bin in Table 13 are specifically set. The offset values and the context index values by bin in Table 17 can be set to be different from the values shown in Table 17 so as to indicate suitable contexts.

By applying different offsets depending on the state information or the condition, different contexts depending on the condition may be allocated, independent contexts may be applied to some bins of the bins constituting a codeword of a syntax (syntax element), and the bypass mode may be applied to the other bins. For example, when Table 13 is assumed for a predetermined syntax (syntax element), some of the values of B0, B1, B2, B3, and B4 can be set to different index values and the other of the values of B0, B1, B2, B3, and B4 can be set to indicate the bypass mode instead of the specific index values.

Table 18 shows an example of a context table which can be used in a case where the offset value is set so as to define different contexts depending on the slice type, independent contexts are applied to some bins, and the bypass mode is applied to the other bins.

TABLE 18

| Type | Offset | Context index by bin | | | | |
|---|---|---|---|---|---|---|
| | | 0 | 1 | 2 | 3 | 4 |
| I | 0 | 0 | 1 | bypass | bypass | bypass |
| P | 2 | 0 | 1 | bypass | bypass | bypass |
| B | 4 | 0 | 1 | bypass | bypass | bypass |

When Table 18 is assumed to be applied to a predetermine syntax (syntax element), 0 is allocated as the context index by bin to the 0-th bin constituting the codeword of the corresponding syntax (syntax element), 1 is allocated as the context index by bin to the first bin, and the bypass mode is applied to the second to fourth bins.

Table 18 shows an example where the offset value and the context index value by bin in Table 13 are specifically set. The offset values and the context index values by bin in Table 18 can be set to be different from the values shown in Table 18 so as to indicate suitable contexts.

By applying different offsets depending on the state information or the condition, different contexts depending on the condition may be allocated, the same context may be commonly applied to some bins of the bins constituting a codeword of a syntax (syntax element), and the bypass mode may be applied to the other bins. For example, when Table 13 is assumed for a predetermined syntax (syntax element), some of the values of B0, B1, B2, B3, and B4 can be set to the same index value and the other of the values of B0, B1, B2, B3, and B4 can be set to indicate the bypass mode instead of the specific index values.

Table 19 shows an example of a context table which can be used in a case where the offset value is set so as to define different contexts depending on the slice type, the same context is commonly applied to some bins, and the bypass mode is applied to the other bins.

TABLE 19

| Type | Offset | Context index by bin | | | | |
|---|---|---|---|---|---|---|
| | | 0 | 1 | 2 | 3 | 4 |
| I | 0 | 0 | 0 | bypass | bypass | bypass |
| P | 1 | 0 | 0 | bypass | bypass | bypass |
| B | 2 | 0 | 0 | bypass | bypass | bypass |

When Table 19 is assumed to be applied to a predetermine syntax (syntax element), 0 is allocated as the context index by bin to the 0-th and first bins constituting the codeword of the corresponding syntax (syntax element) and the bypass mode is applied to the second to fourth bins.

Table 19 shows an example where the offset value and the context index value by bin in Table 13 are specifically set. The offset values and the context index values by bin in Table 19 can be set to be different from the values shown in Table 19 so as to indicate suitable contexts.

By applying different offsets depending on the state information or the condition, different contexts depending on the condition may be allocated, the bypass mode may be applied to one bin of the bins constituting a codeword of a syntax (syntax element) and the same context may be commonly applied to the other bins. For example, when Table 13 is assumed for a predetermined syntax (syntax element), one bin of the values of B0, B1, B2, B3, and B4 can be set to indicate the bypass mode instead of the specific index values and the other of the values of B0, B1, B2, B3, and B4 can be set to the same index value.

Table 20 shows an example of a context table which can be used in a case where the offset value is set so as to define different contexts depending on the slice type, the bypass mode is applied to one bin, and the same context is commonly applied to the other bins.

TABLE 20

| Type | Offset | Context index by bin | | | | |
|---|---|---|---|---|---|---|
| | | 0 | 1 | 2 | 3 | 4 |
| I | 0 | 0 | 0 | 0 | 0 | bypass |
| P | 1 | 0 | 0 | 0 | 0 | bypass |
| B | 2 | 0 | 0 | 0 | 0 | bypass |

When Table 20 is assumed to be applied to a predetermine syntax (syntax element), 0 is allocated as the context index by bin to the 0-th to third bins constituting the codeword of the corresponding syntax (syntax element) and the bypass mode is applied to the fourth bin.

Table 20 shows an example where the offset value and the context index value by bin in Table 13 are specifically set. The offset values and the context index values by bin in Table 20 can be set to be different from the values shown in Table 20 so as to indicate suitable contexts.

On the other hand, while Tables 13 to 20 show the examples where a codeword of a syntax includes 5 bins, the invention is not limited to the examples. When the codeword of the syntax (syntax element) to which Tables 13 to 20 includes bins less than 5, for example, n bins (where n<5), the context index by bin is not allocated to or na (not available) is allocated to the bin index larger than n−1 and equal to or less than 4. When the codeword of the syntax (syntax element) to which Table 14 is applied includes 5 or more bins, the same value as the context index of the fifth bin can be allocated as the context index of the bin subsequent to the fifth bin.

While the same context index by bin is applied to the same bin in Tables 13 to 20, the invention is not limited to this example, but the value of the context index by bin may be set to be different depending on the offset. For example, the values of Bi (where i=0, 1, 2, 3, 4) may be set to be different for A1 to A3 in Table 13. Specifically, at least one of the value of B0 for A1, the value of B0 for A2, and the value of B0 for A3 may be set to be different from the other values of B0.

The examples of Tables 13 to 20 can be applied to a systax (syntax element) transmitted in the course of coding. For example, the same is true of various syntax elements as well as the above-mentioned syntax element intra_chroma_pred_mode.

Table 21 shows an example where the above-mentioned details are applied to various syntax elements.

TABLE 21

| Syntax element | ctxIdxTable | ctxIdxOffset | binIdx 0 | 1 | 2 | 3 | >=4 |
|---|---|---|---|---|---|---|---|
| sao_type_idx | Table 1 | 0 | 0 | 1 | 1 | na | na |
|  |  | 2 | 0 | 1 | 1 | na | na |
|  |  | 4 | 0 | 1 | 1 | na | na |
| sao_offset | Table 2 | 0 | 0 | 1 | 2 | 2 | 2 |
|  |  | 3 | 0 | 1 | 2 | 2 | 2 |
|  |  | 6 | 0 | 1 | 2 | 2 | 2 |
| cu_qp_delta | Table 3 | 0 | 0 | na (uses Decode Bypass) | 1 | 2 | 2 |
|  |  | 3 | 0 | na (uses Decode Bypass) | 1 | 2 | 2 |
|  |  | 6 | 0 | na (uses Decode Bypass) | 1 | 2 | 2 |
| prev_intra_luma_pred_flag | Table 4 | 0 | 0 | na | na | na | na |
|  |  | 1 | 0 | na | na | na | na |
|  |  | 2 | 0 | na | na | na | na |
| intra_chroma_pred_mode (chroma_pred_from_luma_enabled_flag == true) | Table 5 | 0 | 0 | 1 | na | na | na |
|  |  | 2 | 0 | 1 | na | na | na |
|  |  | 4 | 0 | 1 | na | na | na |
| intra_chroma_pred_mode (chroma_pred_from_luma_enabled_flag == false) | Table 6 | 0 | 0 | na | na | na | na |
|  |  | 2 | 0 | na | na | na | na |
|  |  | 4 | 0 | na | na | na | na |

In the example of Table 21, the context index by bin is indicated by bin index (binIdx). The context index by bin is determined as the sum of the value of the offset ctxIdxOffset and the value of context index by bin.

The context index determined for a specific bin of a predetermined syntax element can indicate a context to be applied to the specific bin indicated by the context index table ctxIdxTable for the corresponding syntax element.

On the other hand, the value of context index by bin may be determined on the basis of block information (for example, information on a block state or a block condition). At this time, the block information includes information on neighboring blocks of a block to be decoded in addition to information on the block to be decoded. The used block information may be information of a coding block, information of a prediction block, or information of a transform block. For example, the block information can be used to determine contexts of syntax elements such as cbf_luma, cbf_cb, and cbf_cr. The syntax elements cbf_luma, cbf_cb, and cbf_cr are syntax elements representing information indicating whether a luma residual signal is present in a block further divided from a current block in a quad tree structure or whether a chroma residual signal is present therein.

Specifically, when coding (encoding/decoding) cbf_luma, cbf_cb, and cbf_cr, the contexts of cbf_luma, cbf_cb, and cbf_cr can be determined in consideration of the coding unit depth and/or the transform unit depth of neighboring partitions (blocks) in addition to cbf (Coded Block Flag) information of the neighboring blocks. For example, the size of a current transform unit can be calculated using the coding unit depth and the transform unit depth, and contexts can be distinguished or designated in consideration of the transform unit size of the neighboring partitions at that time.

The contexts may be distinguished or designated using the transform unit size of a neighboring partition and the cbf of the corresponding partition. For example, when the contexts of cbf_luma are distinguished or designated, the contexts of cbf_luma can be individually applied to (1) a case where the values of cbf_luma for neighboring blocks of a current block, for example, blocks located on the left side and the top side of the current block are all 0 and the size of the transform unit is equal to or larger than the size of the current transform unit, (2) a case where the value of cbf_luma for a block on any one side out of the neighboring blocks of a current block, for example, blocks located on the left side and the top side of the current block is 0 and the size of the transform unit is equal to or larger than the size of the current transform unit, and (3) a case where the values of cbf_luma for the neighboring blocks of a current block, for example, blocks located on the left side and the top side of the current block are all 1 or the size of the transform unit is smaller than the size of the current transform unit.

This description on cbf_luma can be similarly applied to cbf_cb and cbf_cr. For example, regarding cbf_cr, the contexts of cbf_cr can be individually applied to (1) a case where the values of cbf_cr for neighboring blocks of a current block, for example, blocks located on the left side and the top side of the current block are all 0 and the size of the transform unit is equal to or larger than the size of the current transform unit, (2) a case where the value of cbf_cr for a block on any one side out of the neighboring blocks of a current block, for example, blocks located on the left side and the top side of the current block is 0 and the size of the transform unit is equal to or larger than the size of the current transform unit, and (3) a case where the values of cbf_cr for the neighboring blocks of a current block, for example, blocks located on the left side and the top side of the current block are all 1 or the size of the transform unit is smaller than the size of the current transform unit.

Regarding cbf_cb, the contexts of cbf_cb can be individually applied to 1) a case where the values of cbf_cb for neighboring blocks of a current block, for example, blocks located on the left side and the top side of the current block are all 0 and the size of the transform unit is equal to or larger than the size of the current transform unit, (2) a case where the value of cbf_cb for a block on any one side out of the neighboring blocks of a current block, for example, blocks located on the left side and the top side of the current block is 0 and the size of the transform unit is equal to or larger than the size of the current transform unit, and (3) a case where the values of cbf_cb for the neighboring blocks of a current block, for example, blocks located on the left side and the top side of the current block are all 1 or the size of the transform unit is smaller than the size of the current transform unit.

The contexts may be be distinguished or designated in consideration of the ratio of cbf in a neighboring partition having the same size as the current transform unit. For example, when the contexts of cbf_luma are distinguished or designated, the contexts of cbf_luma can be individually distinguished or designated in (1) a case where the ratio at which the value of cbf_luma in a neighboring partition having the same size as the current transform unit is 0 in two directions of the neighbors (for example, the left side and the top side) of the current block is equal to or more than 50%, (2) a case where the ratio at which the value of cbf_luma in a neighboring partition having the same size as the current transform unit is 0 in only one direction of the neighbor (for example, the left side and the top side) of the current block is equal to or more than 50%, and (3) a case where the ratio at which the value of cbf_luma in a neighboring partition having the same size as the current transform unit is 0 in two directions of the neighbors (for example, the left side and the top side) of the current block is less than 50%.

This description on cbf_luma can be similarly applied to cbf_cb and cbf_cr.

For example, regarding cbf_cr, the contexts of cbf_cr can be individually distinguished or designated in (1) a case where the ratio at which the value of cbf_cr in a neighboring partition having the same size as the current transform unit is 0 in two directions of the neighbors (for example, the left side and the top side) of the current block is equal to or more than 50%, (2) a case where the ratio at which the value of cbf_cr in a neighboring partition having the same size as the current transform unit is 0 in only one direction of the neighbor (for example, the left side and the top side) of the current block is equal to or more than 50%, and (3) a case where the ratio at which the value of cbf_cr in a neighboring partition having the same size as the current transform unit is 0 in two directions of the neighbors (for example, the left side and the top side) of the current block is less than 50%.

Regarding cbf_cb, the contexts of cbf_cb can be individually distinguished or designated in (1) a case where the ratio at which the value of cbf_cb in a neighboring partition having the same size as the current transform unit is 0 in two directions of the neighbors (for example, the left side and the top side) of the current block is equal to or more than 50%, (2) a case where the ratio at which the value of cbf_cb in a neighboring partition having the same size as the current transform unit is 0 in only one direction of the neighbor (for example, the left side and the top side) of the current block is equal to or more than 50%, and (3) a case where the ratio at which the value of cbf_cb in a neighboring partition having the same size as the current transform unit is 0 in two directions of the neighbors (for example, the left side and the top side) of the current block is less than 50%.

The contexts may be distinguished or designated in consideration of the ratio of cbf in plural neighboring partitions. The context may be simply distinguished or designated in consideration of the cbf of plural neighboring partitions. For example, when the contexts of cbf_luma are distinguished or designated, the contexts of cbf_luma can be individually distinguished or allocated in (1) a case where the values of cbf_luma for sample partitions in two directions of the neighbors (for example, the left side and the top side) of the current block are all 0, (2) a case where the value of cbf_luma for sample partitions in only one direction of the neighbor (for example, the left side and the top side) of the current block is 0, and (3) a case where any value of cbf_luma for sample partitions in two directions of the neighbors (for example, the left side and the top side) of the current block is 1.

This description on cbf_luma can be similarly applied to cbf_cb and cbf_cr.

For example, regarding cbf_cr, the contexts of cbf_cr can be individually distinguished or allocated in (1) a case where the values of cbf_cr for sample partitions in two directions of the neighbors (for example, the left side and the top side) of the current block are all 0, (2) a case where the value of cbf_cr for sample partitions in only one direction of the neighbor (for example, the left side and the top side) of the current block is 0, and (3) a case where any value of cbf_cr for sample partitions in two directions of the neighbors (for example, the left side and the top side) of the current block is 1.

Regarding cbf_cb, the contexts of cbf_cb can be individually distinguished or allocated to (1) a case where the values of cbf_luma for sample partitions in two directions of the neighbors (for example, the left side and the top side) of the current block are all 0, (2) a case where the value of cbf_luma for sample partitions in only one direction of the neighbor (for example, the left side and the top side) of the current block is 0, and (3) a case where any value of cbf_luma for sample partitions in two directions of the neighbors (for example, the left side and the top side) of the current block is 1.

A method of selecting a neighboring partition by a predetermined unit such as a least transform unit can be used as the method of selecting a neighboring partition. At this time, the least transform unit can be determined using the RQT (Residual Quad Tree) maximum depth.

A method of selecting a predetermined number of neighboring partitions by the least transform unit may be used as the method of selecting a neighboring partition. For example, two partitions may be selected by the least transform unit out of the neighboring partitions.

On the other hand, the above-mentioned methods used to distinguish or designate the contexts of cbf_luma, cbf_cr, and cbf_cb can be similarly applied to other syntax elements, for example, no_residual_data_flag indicating the presence of a residual signal.

For example, the contexts may be distinguished or designated using the transform unit size of a neighboring partition and no_residual_data_flag of the neighboring partition. Specifically, when the contexts of no_residual_data_flag are distinguished or designated, the contexts of no_residual_data_flag can be individually applied to (1) a case where the values of no_residual_data_flag for neighboring blocks of a current block, for example, blocks located on the left side and the top side of the current block are all 0 and the size of the transform unit is equal to or larger than the size of the current transform unit, (2) a case where the value of no_residual_data_flag for a block on any one side out of the neighboring blocks of a current block, for example, blocks located on the left side and the top side of the current block is 0 and the size of the transform unit is equal to or larger than the size of the current transform unit, and (3) a case where the values of no_residual_data_flag for the neighboring blocks of a current block, for example, blocks located on the left side and the top side of the current block are all 1 or the size of the transform unit is smaller than the size of the current transform unit.

The contexts may be distinguished or designated in consideration of the ratio of no_residual_data_flag in a neighboring partition having the same size as the size of the current transform unit. For example, when the contexts of no_residual_data_flag are distinguished or designated, the contexts of no_residual_data_flag can be individually distinguished or designated in (1) a case where the ratio at which the value of no_residual_data_flag in a neighboring partition having the same size as the current transform unit is 0 in two directions of the neighbors (for example, the left side and the top side) of the current block is equal to or more than 50%, (2) a case where the ratio at which the value of no_residual_data_flag in a neighboring partition having the same size as the current transform unit is 0 in only one direction of the neighbor (for example, the left side and the top side) of the current block is equal to or more than 50%, and (3) a case where the ratio at which the value of no_residual_data_flag in a neighboring partition having the same size as the current transform unit is 0 in two directions of the neighbors (for example, the left side and the top side) of the current block is less than 50%.

The contexts may be distinguished or designated in consideration of the ratio of no_residual_data_flag in plural neighboring partitions. The contexts may be distinguished or designated in consideration of no_residual_data_flag of plural neighboring partitions. For example, when the contexts of no_residual_data_flag are distinguished or designated, the contexts of no_residual_data_flag can be individually distinguished or allocated to (1) a case where the values of no_residual_data_flag for sample partitions in two directions of the neighbors (for example, the left side and the top side) of the current block are all 0, (2) a case where the value of no_residual_data_flag for sample partitions in only one direction of the neighbor (for example, the left side and the top side) of the current block is 0, and (3) a case where the values of no_residual_data_flag for sample partitions in two directions of the neighbors (for example, the left side and the top side) of the current block are all 1.

Table 22 shows an example of a context table which can be applied to a case where the value of the context index by bin is determined on the basis of the information on neighbors.

TABLE 22

| Syntax element | ctxIdxTable, | ctxIdxOffset | binIdx 0 | 1 | 2 | 3 | >=4 |
|---|---|---|---|---|---|---|---|
| split_transform_flag | Table A | 0 | cuDepth + trafoDepth | na | na | na | na |
|  |  | 4 | cuDepth + trafoDepth | na | na | na | na |
|  |  | 8 | cuDepth + trafoDepth | na | na | na | na |
| cbf_luma | Table B | 0 | ( trafoDepth = = 0 ) \|\| ( log2TrafoSize – – Log2MaxTrafoSize ) ? 1 : 0 | na | na | na | na |
|  |  | 2 | ( trafoDepth = = 0 ) \|\| ( log2TrafoSize – – Log2MaxTrafoSize ) ? 1 : 0 | na | na | na | na |
|  |  | 4 | ( trafoDepth = = 0 ) \|\| ( log2TrafoSize = = Log2MaxTrafoSize ) ? 1 : 0 | na | na | na | na |
| cbf_cb, cbf_cr | Table C | 0 | trafoDepth | na | na | na | na |
|  |  | 3 | trafoDepth | na | na | na | na |
|  |  | 6 | trafoDepth | na | na | na | na |

Referring to Table 22, the value of the context index of the 0-th bin out of the bins constituting the codeword of a syntax element split_transform_flag can be determined by the block information. For example, the context index value of the 0-th bin of split_transform_flag is determined by the information of the coding unit depth and the transform unit depth.

In the example of Table 22, the values of the context index of the 0-th bin out of the bins constituting the codewords of the syntax elements cbf_luma, cbf_cb, and cbf_cr are determined by the block information, for example, the information of the transform unit depth. For example, in the syntax element cbf_luma, when the transform unit depth of the 0-th bin is 0 or the transform unit size is the maximum size, 1 can be allocated as the context index by bin.

While the methods in the above-mentioned exemplary system have been described on the basis of a series of steps or a flowchart, the invention is not limited to the order of the steps and a certain step may be performed in an order other than described above or at the same time as described above. The above-mentioned embodiments include various examples.

Therefore, the invention includes embodiments in which the above-mentioned embodiments are simultaneously applied or combined.

The invention claimed is:
1. A method for image encoding performed by an encoding apparatus, the method comprising:
  deriving, by the encoding apparatus, a chroma intra prediction mode of a current block;
  determining, by the encoding apparatus, a value of an intra_chroma_pred_mode syntax element based on the derived chroma intra prediction mode; and
  encoding, by the encoding apparatus, bins of a bin string for the intra_chroma_pred_mode syntax element based on the value of the intra_chroma_pred_mode syntax element,
  wherein the bin string for the intra_chroma_pred_mode syntax element includes a 0th bin, a 1st bin, and a 2nd bin,
  wherein the 0th bin is encoded based on regular coding using context information, and the 1st bin and the 2nd bin are encoded based on bypass coding,
  wherein the context information related to the intra_chroma_pred_mode syntax element is derived based on a sum of an offset and a value represented by the 0th bin,
  wherein the offset is determined based on a slice type for a current slice comprising the current block among an I slice, a P slice and a B slice, and
  wherein a value of the offset is 0 based on the current slice which is the I slice, the value of the offset is 1 based on the current slice which is the P slice, and the value of the offset is 2 based on the current slice which is the B slice.

2. The method of claim 1, wherein the encoding the bins includes encoding the 0th bin, 1st bin, and 2nd bin of the bin string independently with each other.

3. The method of claim 1, wherein the value represented by the 0th bin is represented based on a context index table which assigns a value to the 0th bin.

4. The method of claim 3,
wherein the context index table includes the value of the offset related to the slice type for the current slice.

5. The method of claim 1, wherein the value represented by the 0th bin is '0'.

6. A non-transitory decoder-readable storage medium storing an encoded image information generated by an encoding method comprising deriving, by an encoding apparatus, a chroma intra prediction mode of a current block, determining, by the encoding apparatus, a value of an intra_chroma_pred_mode syntax element based on the derived chroma intra prediction mode, and encoding, by the encoding apparatus, bins of a bin string for the intra_chroma_pred_mode syntax element based on the value of the intra_chroma_pred_mode syntax element to generate the encoded image information, wherein the bin string for the intra_chroma_pred_mode syntax element includes a 0th bin, a 1st bin, and a 2nd bin, wherein the 0th bin is encoded based on regular coding using context information, and the 1st bin and the 2nd bin are encoded based on bypass coding, wherein the context information related to the intra_chroma_pred_mode syntax element is derived based on a sum of an offset and a value represented by the 0th bin, wherein the offset is determined based on a slice type for a current slice comprising the current block among an I slice, a P slice and a B slice, and wherein a value of the offset is 0 based on the current slice which is the I slice, the value of the offset is 1 based on the current slice which is the P slice, and the value of the offset is 2 based on the current slice which is the B slice.

7. A method for image decoding performed by a decoding apparatus, the method comprising:
deriving context information on at least one bin among bins of a bin string for an intra_chroma_pred_mode syntax element;
decoding the bins of the bin string for the intra_chroma_pred_mode syntax element based on the context information;
deriving a value of the intra_chroma_pred_mode syntax element based on the decoded bins;
deriving a chroma intra prediction mode of a current block based on the value of the intra_chroma_pred_mode syntax element;
deriving prediction samples of the current block based on the chroma intra prediction mode; and
generating a reconstructed picture based on the prediction samples,
wherein the bins of the bin string includes a 0th bin, a 1st bin, and a 2nd bin,
wherein the 0th bin is decoded based on regular coding using the context information, and the 1st bin and the 2nd bin are decoded based on bypass coding,
wherein the context information related to the intra_chroma_pred_mode syntax element is derived based on a sum of an offset and a value represented by the 0th bin,
wherein the offset is determined based on a slice type for a current slice comprising the current block among an I slice, a P slice and a B slice, and
wherein a value of the offset is 0 based on the current slice which is the I slice, the value of the offset is 1 based on the current slice which is the P slice, and the value of the offset is 2 based on the current slice which is the B slice.

* * * * *